(12) United States Patent
Bui et al.

(10) Patent No.: US 12,346,378 B2
(45) Date of Patent: Jul. 1, 2025

(54) AUTOMATED DATABASE QUERY GENERATION AND ANALYSIS

(71) Applicant: PayPal, Inc., San Jose, CA (US)

(72) Inventors: Kim Dung Bui, Singapore (SG); Quan Anh Nguyen, Singapore (SG); George Chen Kaidi, Singapore (SG); Phoram Kirtikumar Mehta, Singapore (SG); Van Hoang Nguyen, Singapore (SG); Li Hua Lim, Singapore (SG)

(73) Assignee: PayPal, Inc., San Jose, CA (US)

( * ) Notice: Subject to any disclaimer, the term of this patent is extended or adjusted under 35 U.S.C. 154(b) by 44 days.

(21) Appl. No.: 17/655,944

(22) Filed: Mar. 22, 2022

(65) Prior Publication Data

US 2023/0306061 A1    Sep. 28, 2023

(51) Int. Cl.
  *G06F 16/9032*    (2019.01)
  *G06N 20/00*    (2019.01)

(52) U.S. Cl.
  CPC ......... *G06F 16/9032* (2019.01); *G06N 20/00* (2019.01)

(58) Field of Classification Search
  CPC .......................... G06F 16/9032; G06N 20/00
  See application file for complete search history.

(56) References Cited

U.S. PATENT DOCUMENTS 9,892,125 B1 *   2/2018   Mostak .................. G06F 16/13
10,942,910 B1 *  3/2021   Certain .................. G06F 16/23
11,726,994 B1 *  8/2023   Wang ............... G06F 16/24573
                                                      707/769

(Continued)

FOREIGN PATENT DOCUMENTS

KR    20230003662 A   *   5/2021   ............. G06F 40/30

OTHER PUBLICATIONS

Alon et al. "Code2Seq: Generating Sequences from Structured Representations of Code.", 2019 teaches in Abstract, "the ability to generate natural language sequences from source code snippets". (Year: 2019).*

(Continued)

*Primary Examiner* — Matthew J Ellis
(74) *Attorney, Agent, or Firm* — Kowert, Hood, Munyon, Rankin & Goetzel, P.C.

(57) ABSTRACT

Techniques are disclosed relating to automatically generating and analyzing database queries. In various embodiments, a database inquiry assistance system maintains a first machine learning model trained using query history data for a database and a second machine learning model using analysis history for the database. In an embodiment, the system receives from a user system a request for an inquiry into data stored in the database and identifies a sequence of queries for responding to the request, where identifying the sequence of queries includes applying the second machine learning model to the request. The system generates corresponding database query code for implementing one or more of the queries in the sequence of queries, where generating the corresponding database query code includes applying the first machine learning model to descriptors of one or more of the queries, and sends a plan identifying the sequence of queries to the user system.

20 Claims, 16 Drawing Sheets

(56) References Cited

U.S. PATENT DOCUMENTS

| | | | |
|---|---|---|---|
| 2011/0252073 | A1* | 10/2011 | Pauly .................... G06F 16/213 707/812 |
| 2017/0308571 | A1* | 10/2017 | McCurley ........... G06F 16/2428 |
| 2018/0196850 | A1* | 7/2018 | Schaeffer .......... G06F 16/24542 |
| 2018/0336198 | A1 | 11/2018 | Zhong et al. |
| 2021/0019309 | A1* | 1/2021 | Yadav ................ G06F 16/2428 |
| 2021/0103586 | A1* | 4/2021 | Quamar ............ G06F 16/24535 |
| 2021/0390096 | A1* | 12/2021 | Rahmfeld ................ G10L 15/22 |
| 2021/0390099 | A1* | 12/2021 | Rahmfeld ......... G06F 16/24522 |
| 2022/0075782 | A1* | 3/2022 | Hines .................... G06F 16/211 |
| 2022/0334835 | A1* | 10/2022 | Gottschlich ............ G06N 3/045 |
| 2023/0128497 | A1 | 4/2023 | Vijayan et al. |

OTHER PUBLICATIONS

Baik et al. "Bridging the Semantic Gap with SQL Query Logs in Natural Language Interfaces to Databases", https://arxiv.org/pdf/1902.00031.pdf, pp. 2-10 (Year: 2019).*

Bazaga et al. "Translating synthetic natural language to database queries with a polyglot deep learning framework" Sep. 16, 2021 teaches in abstract—"a machine learning framework, Polyglotter, that in a general way supports the mapping of natural language searches to database queries." (Year: 2021).*

Kumar et al. "Deep Learning Driven Natural Languages Text to SQL Query Conversion: A Survey", Aug. 8, 2022, teaches SyntaxSQLNet on p. 13 for Abstract Syntax Tree usage in making SQL queries. (Year: 2022).*

International Search Report and Written Opinion for Application No. PCT/US2023/064403 mailed on Jul. 3, 2023, 13 pages.

"CODE2SEQ: Generating Sequences From Structured Representations of Code," Uri Alon, et al. arXiv:1808.01400v6 [cs.LG] Feb. 21, 2019, Published as a conference paper at ICLR 2019, pp. 1-22.

"GitHub and OpenAI launch a new AI tool that generates its own code," Dave Gershgrm, The Verge, https://www.theverge.com/2021/6/29/22555777/github-openai-ai-tool-autocomplete-code, Jun. 29, 2021, 2 pages.

"Language Models are Few-Shot Learners," Tom B. Brown, et al., arXiv:2005.14165v4 [cs.CL] Jul. 22, 2020, pp. 1-75.

"Re-examining the Role of Schema Linking in Text-to-SQL," Wenqiang Lei, et al., Proceedings of the 2020 Conference on Empirical Methods in Natural Language Processing, Nov. 16-20, 2020, pp. 6943-6954.

"Attention Is All You Need," Ashish Vaswani, et al., 31st Conference on Neural Information Processing Systems (NIPS 2017), Long Beach, CA, USA, pp. 1-11.

* cited by examiner

210

```
/*

Objective:
Confirm customers had the CIP-verified status prior to
purchasing cryptocurrency, which includes collecting the
data point of name, address, date of birth, and social
security number;

Criteria:
Scope Period:  April 1, 2020 - March 31, 2021

*/
```
212

Step 1.  identify US accounts that transacted in crypto
between April 1st 2020 and March 31st 2021                214

```
CREATE VOLATILE TABLE CRYPTO_CONFIRM AS
(
SELECT
     tran.cust_name
     ,tran.purch_date
     ,CASE WHEN tran.amount<0 THEN 'Buy' ELSE
         'Sell'
     END as
         Payment_Type
FROM purch_db tran WHERE 1=1
     AND product = 'X' -- identifies Crypto AND
     AND purch_date >= '2020-04-01'
     AND purch_date <= '2021-03-31'
QUALIFY Row_Number() Over(PARTITION BY
tran.cust_name, Payment_Type ORDER BY purch_date) = 1
)WITH DATA PRIMARY INDEX
   (cust_name) ON COMMIT PRESERVE
   ROWS;
```
216

| Query ID | Description | Query code | Status | Execution time | User ID | Date/Time |
|---|---|---|---|---|---|---|
| 1234 | Identify accounts that made their 1st Crypto purchase and are not verified | CREATE TABLE CRYPTO_PURCHASE_VERIFICATION AS ( SELECT TAB1.* FROM CRYPTO_PURCHASE_VERIFICATION TAB1 ... | Successful | 100 msec | 5678 | 2021-07-01 05:15:32 |

| Query ID | Serialized AST |
|---|---|
| 1234 | <CreateTable><br><Name> <L value="CRYPTO_PURCHASE_VERIFICATION"/> </Name><br><Query><br><Select><br>... |

| Inquiry ID 732 | Inquiry Details 734 | | | Analysis details 742 | | |
|---|---|---|---|---|---|---|
| | Request description 736 | Request time 738 | Request status 740 | User ID 712 | Query list 746 | Query description list 748 |
| 8765 | Confirm customers had the CIP-verified status prior to purchasing cryptocurrency; Scope period April 1, 2020 – March 31, 2021 | 2021-06-30 18:19:25 | Resolved | 6543 | 2345; 2341; 3216; 4378; ... | Identify US accounts transacting in crypto between April 1 2020 and March 31 2021; Bring in CIP verification status; ... |
| 8907 | Transaction rule A for Country X incorrectly applied to transaction from Country Y | 2022-03-01 04:17:15 | In progress | 6215 | 4321; 5123; 2456; 4123; ... | Identify transactions from Country Y in previous 30 days; Identify transactions involving transaction rule A; ... |

```
┌─────────────────────────────────────────────────┐
│ Maintaining a first machine learning model trained using query │
│ history data for a database, where the query history data │
│ includes previous queries of the database expressed in a │
│ database query code format │
│ 1110 │
└─────────────────────────────────────────────────┘
                          ↓
┌─────────────────────────────────────────────────┐
│ Receiving, at the computer system and from a user system, a │
│ query for obtaining data from the database, where the query is │
│ expressed in the database query code format │
│ 1120 │
└─────────────────────────────────────────────────┘
                          ↓
┌─────────────────────────────────────────────────┐
│ Dividing the query into submodules │
│ 1130 │
└─────────────────────────────────────────────────┘
                          ↓
┌─────────────────────────────────────────────────┐
│ Generating corresponding natural-language step descriptions │
│ for the submodules, where generating the corresponding │
│ natural-language step descriptions includes applying the first │
│ machine learning model │
│ 1140 │
└─────────────────────────────────────────────────┘
                          ↓
┌─────────────────────────────────────────────────┐
│ Generating corresponding updated database query code for │
│ one or more of the natural-language step descriptions, where │
│ generating the updated database query code includes applying │
│ the first machine learning model │
│ 1150 │
└─────────────────────────────────────────────────┘
                          ↓
┌─────────────────────────────────────────────────┐
│ Sending the updated database query code to the user system │
│ 1160 │
└─────────────────────────────────────────────────┘
```

FIG. 11

AUTOMATED DATABASE QUERY GENERATION AND ANALYSIS

BACKGROUND

Technical Field

This disclosure relates generally to database queries, and more particularly to techniques for automatically generating and analyzing queries.

Description of the Related Art

Server computer systems, such as web servers, application servers, email servers, etc., may provide various computing resources and services to an end user. For example, a web service may use a computer system to provide access to software applications to remote users via a network. Large enterprises providing computing resources and services may have many users (e.g., millions) located in different geographic regions worldwide. User interactions with a server system for such an enterprise therefore happen in great numbers at an extremely high rate. Maintaining data to support such global interactions may require extensive databases with complex organizational structures, such as multidimensional databases.

Ensuring proper operation of services provided to users as well as compliance with legal and regulatory requirements requires frequent queries of databases supporting the service. The queries can be very complex and very rapid response is often required. Errors in queries can result from these constraints, giving rise to failure to obtain the correct data when needed.

BRIEF DESCRIPTION OF THE DRAWINGS

FIG. 2B illustrates examples of components of the inquiry plan of FIG. 2A.

FIGS. 7A-7C are tables illustrating examples of machine learning model training data, according to some embodiments.

FIG. 11 is a flow diagram illustrating an example method for automatically updating a query, according to some embodiments.

DETAILED DESCRIPTION

Figure 1:
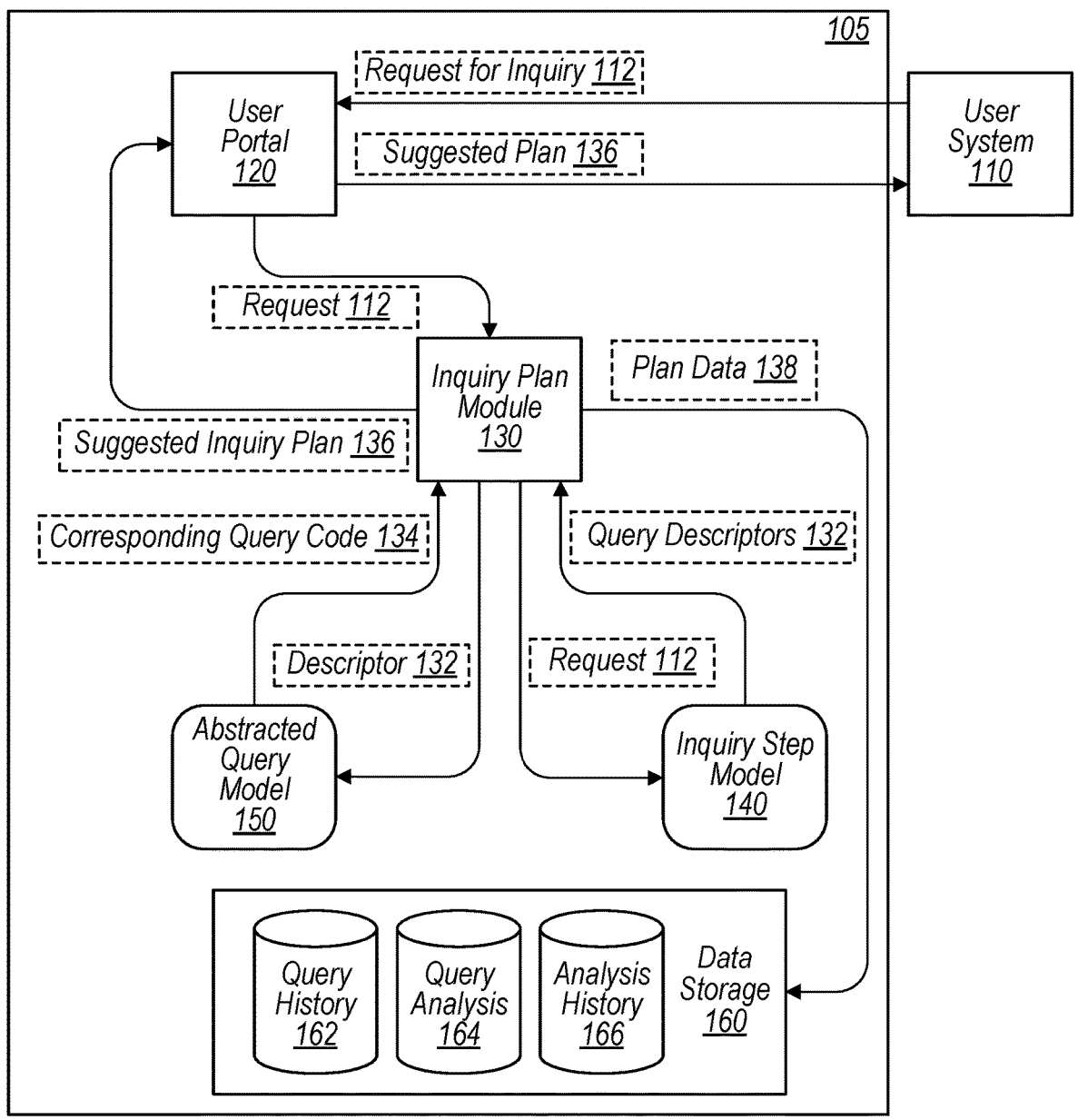
FIG. 1 is a data flow diagram illustrating an example of data flows involving elements of a database inquiry assistance system during operation, according to some embodiments.

In large organizations utilizing databases, internal audit teams have to write and maintain myriad ad hoc database queries to transform and extract important insights as quickly and efficiently as possible for various tasks, including triage of production issues, ad hoc investigation requirements for business and regulatory purposes and reconciliation after data breaches or leakage. Queries are also needed for passive scheduled analyses involving topics such as operations, auditing of potential policy breaches, and status of business acquisition and activation.

An example of the kinds of requirements driving activities of audit teams in enterprises (large-scale, typically global organizations) is "know your client" or "know your customer" ("KYC") regulation. The KYC regulatory framework is designed to identify and prevent fraud and money-laundering, particularly in an effort to counter the financing of terrorism. Typically, KYC regulations require service providers in various industries (e.g., banking, financial services providers, insurers, and various non-financial industries) to determine and verify their users' identity during and over the course of use of the service(s). In many instances, service providers are required to monitor and report (e.g., to regulatory bodies, internal stakeholders, etc.) computed metrics regarding the user-verification requirements, such as the verification fail-rate per country, highest limitation rate, highest limitation rate by limitation type, etc. The service providers may maintain server systems for providing various web services using the computing resources of the server system to perform computing operations on behalf of a requesting entity. Non-limiting examples of web services a server system may provide include email services, streaming media services, map-based services, online payment services, retail services, etc.

Due to the inherently complicated data architecture and models used, the ever-changing requirements and the large number of engineers involved, it is becoming increasingly difficult to maintain and utilize the queries needed for auditing activities. Each query's size can range from tens to hundreds or thousands of lines of code. Documents accessed by a query can become outdated or missing over time, so that a query can't be effectively maintained for later reuse. Moreover, database migration or schema updates can render many existing queries invalid or no longer applicable. Query complexity and size can make it difficult to identify portions of a query that can be reused in a new query, so that it's difficult to transfer or reuse knowledge between team members or from one situation to another, leading to repetition of effort. There can also be questions of a query's logical correctness, soundness and completeness.

Existing query testing and visualization tools are generally not scalable to the size and complexity of enterprise-scale databases. The time required to write and perform test queries in Structured Query Language (SQL), for example, makes this approach inadequate for keeping up with time-sensitive investigation of production incidents. Documenting of query portions, or snippets, for later reuse is typically done manually by individual engineers or analysts. Existing query visualization tools such as QueryVis become less helpful as the sizes and numbers of tables in a database increase, and when complex filtering logic is used.

To address these problems, a systematic solution is disclosed to manage ad hoc queries and to learn and transfer knowledge from previous investigations and analyses. The solution is configured to auto-generate new investigation/analysis plans for future incidents or audit requests, with automated annotating of large queries to produce reliable results. In an embodiment, the solution includes a query analysis module and an inquiry plan module.

An embodiment of the query analysis module employs an abstracted query model for conversion between database query code and natural-language descriptions of the steps carried out by the code. This conversion allows automated annotation of complex queries received from a user system in query code format and query code generation for queries received in a semi-structured or natural-language format. Embodiments of the query analysis module provide automated updating of invalid database and field names in a received query. The query analysis module may further apply static analysis for evaluating query syntax and soundness, providing feedback to the requester in the event of an incorrect or unsound query rather than submitting it to the database. The module may also employ local caching to limit calls to the database server. In an embodiment, the query analysis module implements one or more proxy servers between the user system and database server.

An embodiment of the inquiry plan module employs an inquiry step model to determine a sequence of queries for carrying out a requested inquiry involving a database. In various embodiments, a request for an inquiry may be in the form of details of a production incident involving the database or in the form of a description of specific information needed from the database. The inquiry step model is trained using analysis history data including previous sequences of queries used for previous investigations involving the database. In an embodiment, the inquiry plan module further employs the abstracted query model to generate database query code corresponding to the queries in the sequence. In various embodiments, operation of the inquiry plan module allows insights from previous inquiries to be utilized in later inquiries, and for sound queries implementing the inquiries to be efficiently generated.

An example illustrating use of the disclosed solution is shown in the data flow diagram of FIG. 1. In process flow 100 of FIG. 1, a user system 110 sends a request for inquiry 112 to a user portal 120 of a database inquiry assistance system 105. In an embodiment, user system 110 is a computing system operated by a user needing to access information in a database accessible by the database inquiry assistance system. For example, the user may be an analyst conducting auditing activity within an organization. In some embodiments the request may be sent automatically through operation of an application program.

An "inquiry" as used herein is a request for information, where responding to the request involves accessing data stored by the database. In an embodiment, an inquiry has a nature or scope such that multiple database queries are required to address the inquiry. Request for inquiry 112 is in some embodiments in the form of a set of incident details, where an incident is an event outside of normal operations involving the database. An incident may be an unauthorized transmission of data from the database, for example, or a "data leakage." In some embodiments, an incident is a failure to properly apply rules involving database access. In the case of a database supporting transactions, for example, an incident could include improper approval or denial of a transaction or type of transaction. Details of an incident included in request for inquiry may include a description of the incident, a location of the incident such as a network domain, identifiers of users connected to the incident or its discovery, times that the incident occurred or was discovered, and any other relevant information for investigating the incident.

In some embodiments request for inquiry 112 is in the form of a request for specific information, where the request may not relate to a particular incident, or at least not a known incident. In the case of a database supporting transactions, a simple example of such a request could be a question of what fraction of transactions originating in a particular country used a particular currency during a particular time period to buy a particular product or class of products. Actual requests can be much more complex, however, given the complexity and scale of the databases used, and responding to the request can require a long sequence of database queries to be generated. In an embodiment, request for inquiry 112 is submitted in a natural-language form, rather than as a query in a database query code format such as SQL.

User portal 120 provides an interface for entry to the database inquiry assistance system, such as a graphical user interface (GUI) for an operator of user system 110 or an application program interface (API) for a program running on user system 110. As described further in connection with FIGS. 3-4B below, user portal 120 in some embodiments distinguishes request for inquiry 112 from other types of user input that may be provided to the database inquiry assistance system. In the embodiment of FIG. 1, user portal 120 forwards request 112 to inquiry plan module 130 within the database inquiry assistance system.

Inquiry plan module 130 includes program instructions executable by a processor to generate a suggested inquiry plan 136 for responding to request 112. In the embodiment of FIG. 1, operation of module 130 includes applying inquiry step model 140 to received request 112, to produce one or more query descriptors 132. In an embodiment, query descriptors 132 are natural-language step descriptions of corresponding database queries for responding to the received request. A set of descriptors 132 in such an embodiment is a list of steps describing a sequence of database queries for responding to the request.

Inquiry step model 140 is a machine learning model trained using analysis history data 166 stored in data storage 160. Analysis history data 166 includes previous requests for inquiries involving the database and identifies previous sequences of queries for responding to the previous requests. In an embodiment, training of model 140 allows the model to identify proposed query sequences for incoming requests by learning from how previous requests were handled. This may allow knowledge and experience of various analysts performing database operations to benefit the work of other analysts without the same experience.

In the embodiment of FIG. 1, operation of inquiry plan module 130 may also include applying abstracted query model 150 to one or more of query descriptors 132 obtained using inquiry step model 140, to produce query code 134 corresponding to the received descriptors. Query code 134 is functional code executable to implement a database query, expressed in a database query code format such as SQL. Abstracted query model 150 is a machine learning model trained using query history data 162 stored in data storage 160. Query history data 162 includes previous queries performed on the database accessible using the database inquiry assistance system. In an embodiment, abstracted query model 150 generates abstract syntax trees (ASTs) corresponding to received query descriptors 132 in the process of generating query code corresponding to the descriptors. In such an embodiment, model 150 is also trained using query analysis data 164. Query analysis data 164 includes abstract tree information corresponding to queries in query history data 162.

As part of process flow 100, inquiry plan module 130 combines query descriptors 132 and corresponding query code 134 to form a suggested inquiry plan 136 which it sends to the user system via user portal 120. Module 130 also adds plan data 138 from inquiry plan 136 to the model training data stored in data storage 160. For example, request 112 and corresponding descriptors 132 are added to analysis history 166 in one embodiment. Query code 134 is added to query history 162 in some embodiments. AST data used to obtain query code 134 may be added to query analysis data 164.

Process flow 100 of FIG. 1 allows a user system to submit a request for a database inquiry and receive a suggested inquiry plan including a sequence of queries for carrying out the request. In an embodiment, the user system can request execution of the suggested plan (submission of the queries to the database) by the database inquiry assistance system, with or without first modifying the suggested plan. In an embodiment, operation of inquiry plan module 130 allows an appropriate sequence of database queries to be generated quickly and efficiently. Training of the inquiry step model and abstracted query model using selected historical training data results in potentially more logically sound and correct queries than those generated on an ad hoc basis by an analyst. Use of the abstracted query model to generate query code corresponding to a query descriptor allows changes in database schema to be incorporated into the query code, reducing the potential for "dead queries" resulting from reuse of queries having outdated table or field references.

In an embodiment, use of an inquiry step model such as model 140 allows a user to benefit from the experience of previous users who have performed similar inquiries. Some existing solutions may attempt to generate queries from a request by mapping quantities mentioned in the request to database tables or fields. There may be substantial insight useful in creating an inquiry plan that won't be uncovered with this type of mapping, however. For example, in the case of a request for information about customers who have attained a certain government-verified status needed for purchasing cryptocurrency, information that some analysts may know from experience may include a relevant date range for cryptocurrency inquiries based on history of an organization's offerings and policies or a knowledge that a customer's first cryptocurrency purchase is the most important to examine because the government verification should occur for the first purchase but may not be needed for subsequent purchases.

Figure 2A:
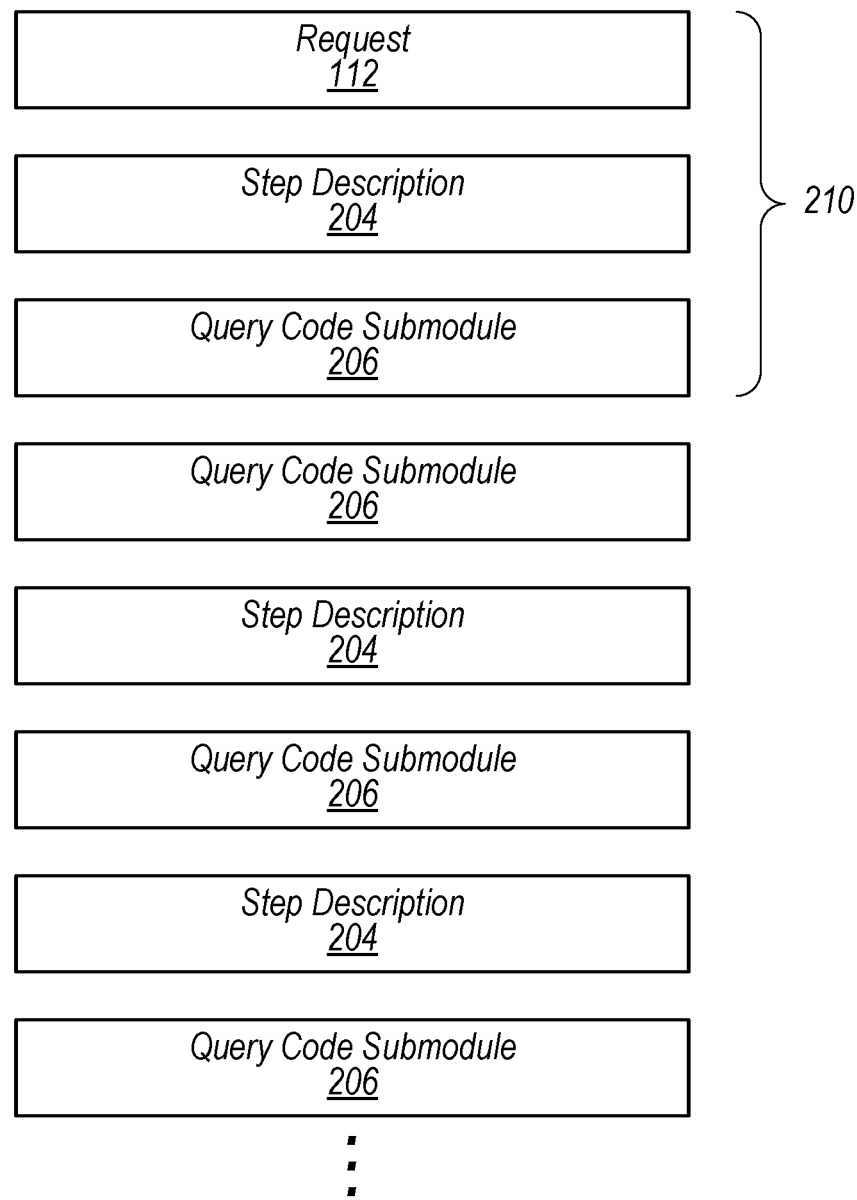
FIG. 2A is a block diagram illustrating a structure of a database inquiry plan, according to some embodiments.

A block diagram illustrating the structure of an example of a database inquiry plan such as suggested inquiry plan 136 of FIG. 1 is depicted in FIG. 2A. Inquiry plan 200 of FIG. 2A starts with a request 112 as described in connection with FIG. 1 above. Following request 112 is a series of step descriptions 204, where each step description is followed by one or more query code submodules 206. Step descriptions 204 describe steps to be carried out in responding to request 112. Submodules 206 contain query code executable to implement a database query described by the corresponding step description 204. As such, a step description 204 is an example of a query descriptor 132 that can be produced by inquiry step model 140 of FIG. 1. An inquiry plan can include multiple steps with corresponding query code, only some of which are shown in FIG. 2A, as indicated by the ellipsis at the bottom of the figure.

Examples of the inquiry plan components of FIG. 2A are shown in FIG. 2B. FIG. 2B illustrates an upper portion 210 of the inquiry plan of FIG. 2A, with examples of content of each component within that portion. In the example of portion 210, request 212 is an instance of a request 112 from FIG. 2A, in this case a request for specific data involving customers verified under a regulatory program called Customer Identification Program (CIP) before purchasing cryptocurrency during a specified period of time. Step description 214 in this example is an instance of a step description 204 from FIG. 2A, in this case a step of identifying US accounts transacting in cryptocurrency during the specified time period. Query code submodule 216 in this example is an instance of a submodule 206 from FIG. 2A, in this case an SQL command for creating a table using data from particular fields of the database to be queried. Query code 216 forms at least part of the code used to implement the operation described in its overlying step description 214. An inquiry plan such as plan 200 of FIG. 2A can also be thought of as a kind of lengthy annotated query.

Figure 3:
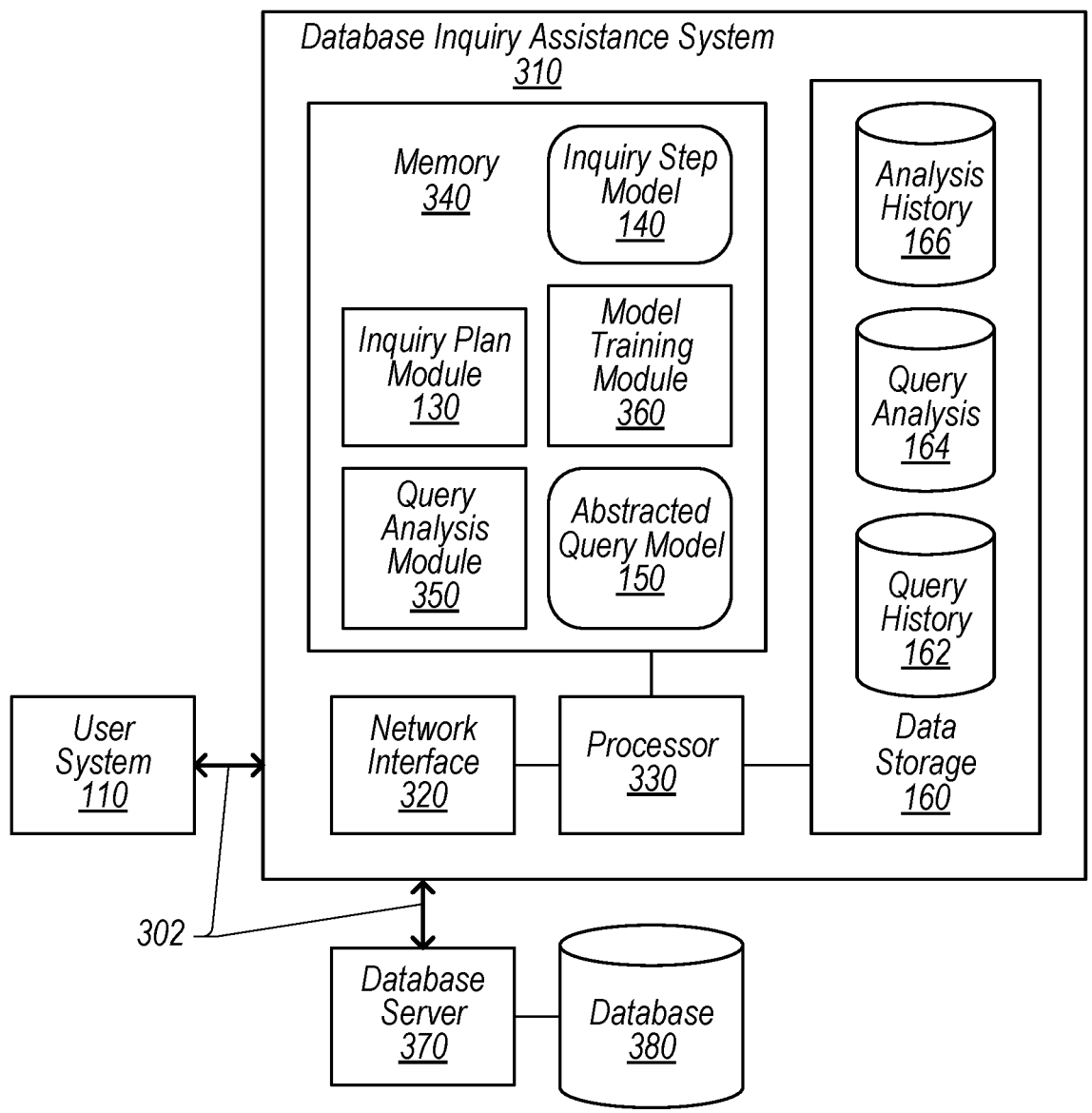
FIG. 3 is a block diagram illustrating an example of a database inquiry assistance system, according to some embodiments.

A block diagram showing an example of a database inquiry assistance system similar to system 105 of FIG. 1 is shown in FIG. 3. A server system 300 of FIG. 3 includes database inquiry assistance system 310 coupled via communication links 302 to user system 110 and a database server 370 accessing a database 380. Database 380 may be a multidimensional database such as an online analytical processing (OLAP) database, or any other suitable database. In an embodiment, database server 370 carries out query management and optimization functions for the database. In the embodiment of FIG. 3, database inquiry assistance system 310 includes a network interface 320, processor 330, memory 340 and data storage 160.

Network interface 320 is configured to communicate with other systems and devices, such as by sending and receiving data and signals over communication links 302. Although shown as a single interface for simplicity, interface 320 may include multiple communications interfaces for use with various link types or protocols. Communication links 302 may be wired, wireless or combinations thereof. Processor 330 is a processor configured to execute programs stored in memory 340. In some embodiments processor 330 is a system of multiple processors among which execution of programs is divided. Although shown as external to processor 330 in this Figure, memory 340 can in other embodiments be internal to one or more processors or include a combination of internal and external memory. Data storage 160 can take any suitable form including semiconductor memory, magnetic or optical disk storage, or solid-state drives. In some embodiments some or all of data storage 160 is accessed via a network connection. Data storage 160 is configured to store data used in carrying out functions of system 310, including data for training machine learning models. This model training data includes query history data 162, query analysis data 164 and analysis history data 166.

In addition to modules and models described in connection with FIG. 1 above, such as inquiry plan module 130, inquiry step model 140 and abstracted query model 150, memory 340 stores instructions executable to implement query analysis module 350 and module training module 360.

Query analysis module 350 includes program instructions executable to analyze a received query before it is submitted to the database for execution. In some embodiments, module 350 generates database query code for a query received in a semi-structured format, such as a natural-language step description. Module 350 may also check query syntax using static analysis in some embodiments and may implement a local cache to limit calls to the database. Query analysis module 350 employs abstracted query model 150 in some embodiments. Operation of query analysis module 350 is described further in connection with FIGS. 4A and 4B below.

Model training module 360 includes program instruction executable to train inquiry step model 140 using analysis history data 166 and to train abstracted query model 150 using query history data 162. In an embodiment, training module 360 also uses query analysis data 164 in training abstracted query model 150. In the case of a supervised machine learning model, training of a model includes applying the model to a set of the training data, evaluating the correctness of the model result, and adjusting model parameters to improve the correctness of the model. In some embodiments training module 360 is split between separate training modules for model 140 and model 150. Model training and the nature of models 140 and 150 is described further in connection with FIGS. 5-7C below.

Although not shown in FIG. 3, memory 340 of system 310 may also include instructions executable to implement a user portal such as user portal 120 of FIG. 1. A user portal module may particularly be desirable in embodiments in which system 310 receives multiple different types of input from a user system, where some input types are to be routed to inquiry plan module 130 and other input types to query analysis module 350. In other embodiments, user interface functions may be incorporated into one or both of inquiry plan module 130 or query analysis module 350. Modules, models and data stores illustrated herein may in various embodiments be combined into fewer modules, models or data stores or split into multiple modules, models or data stores. Elements of system 310 can also be implemented using multiple computer systems in some embodiments. For example, model training module 360 and the model training data it uses may be implemented using a separate computer system than other components of system 310, such that an embodiment of a database inquiry assistance system in operation would not include model training module 360. A system such as system 310 may in some embodiments be implemented in a distributed computing environment, such as a cloud computing environment. Data and programs may be stored in different parts of the system in some embodiments; for example, a data collection or program shown as being stored in memory may instead be stored in data storage, or vice versa.

Figure 4A:
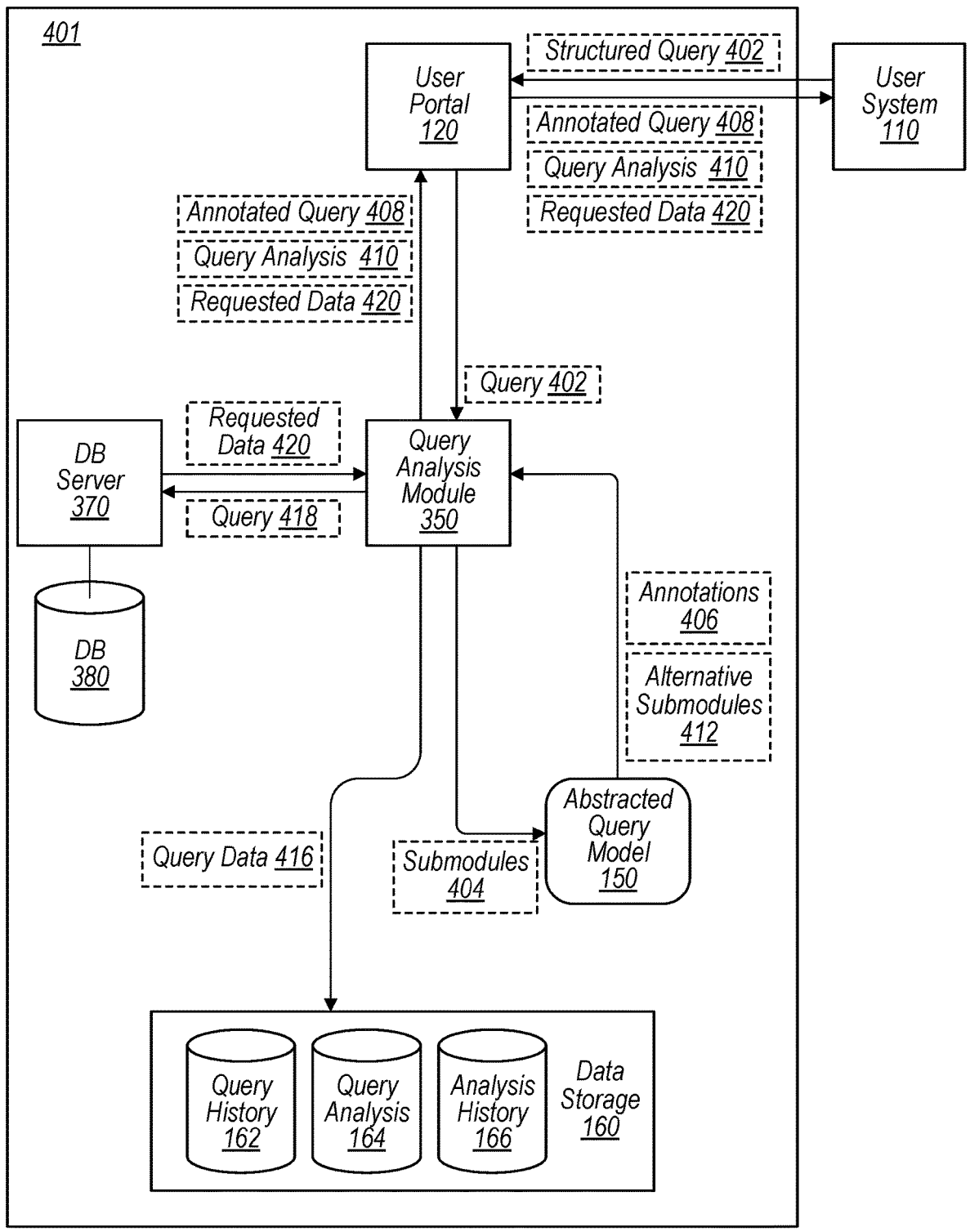
FIGS. 4A-4B are data flow diagrams illustrating examples of data flows involving elements of a database inquiry assistance system during operation, according to some embodiments.

A data flow diagram illustrating a process of using the disclosed solution is shown in FIG. 4A. Process flow 400 of FIG. 4A can be carried out using a database inquiry assistance system 401. System 401 is similar to system 310 of FIG. 3, except that in some embodiments system 401 does not need to include inquiry plan module 130. Process flow 400 differs from process flow 100 of FIG. 1 in that a different type of input is submitted by user system 110, leading to different data paths through elements of a database inquiry assistance system. In process flow 100 of FIG. 1, a request for inquiry 112 is submitted by user system 110. In process flow 400 of FIG. 4A, on the other hand, a structured query 402 is submitted. Structured query 402 is a query written in database query code, such as SQL or other appropriate code for accessing database 380 using database server 370. In an embodiment, query 402 is a long query containing multiple smaller queries, such as query code submodules 206 of FIGS. 2A and 216 of FIG. 2B. A structured query such as query 402 may be submitted by an analyst or engineer not looking for guidance as to what sequence of queries to use. Query 402 may nonetheless have logical errors or outdated table or field references, particularly if it is an older query being reused or a very long and complex query.

In the embodiment of FIG. 4A, user portal 120 determines that structured query 402 is a structured query rather than, for example, a request for an inquiry. In an embodiment, this determination is made using user selections in an interface presented by user portal 120. In another embodiment, user portal 120 may make a determination by parsing or otherwise analyzing some portion of query 402. As a structured query, query 402 is forwarded to query analysis module 350.

Query analysis module 350 divides structured query module 402 into query code submodules 404, similar to submodules 206 of FIGS. 2A and 216 of FIG. 2B. Module 350 applies abstracted query model 150 to submodules 404 to produce natural-language descriptions, or annotations, 406 corresponding to the submodules. In an embodiment, annotations 406 are generated by abstracted query model 150 using AST representations of submodules 404. Annotations 406 are similar to step descriptions 204 of FIGS. 2A and 214 of FIG. 2B. In one embodiment, query analysis module 350 combines annotations 406 and corresponding query code submodules 404 so that each annotation appears above its corresponding code submodule to form an annotated query 408. Annotated query 408 is then returned to user system 110 via user portal 120.

Annotation of a received structured query and return of annotated query 408 to the user system may help a user to determine whether the submitted query is free of logical errors and will perform as intended. In an embodiment for which structured query 402 is submitted with initial annotations, the initial annotations may be included in annotated query 408 for comparison to automatic annotations 406. Alternatively, a comparison of initial and automatic annotations may be provided within separate query analysis results 410.

In some embodiments query analysis module 350 may propose alternative query code submodules for one or more of the submodules in structured query 402. In an embodiment, alternative submodules are generated by using abstracted query model 150 to generate new query code corresponding to one or more of automatic annotations 406. This query code generation uses abstracted query model 150 in a manner similar to the way model 150 is used by inquiry plan module 140 in process flow 100 of FIG. 1. As shown by process flows 100 and 400, abstracted query model 140 can be run in both directions: to generate query code from step descriptions or vice versa. Based on its training using query history data 162, abstracted query model 140 may come up with more efficient or otherwise improved query code to implement a particular step description. In some embodiments, generating alternative submodules may include modifying an AST representation of a query code submodule followed by conversion of the modified AST to query code. Alternative submodules 412 are returned to user system 110 via user portal 120. In an embodiment, submodules 412 are returned through one or both of incorporating the alternative submodules into annotated query 408 or including the proposed alternative submodules into query analysis results 410.

In an embodiment, an alternative submodule 412 has updated database schema references (such as table or field references) as compared to its corresponding initial submodule 404. In some embodiments, abstracted query module 150 is programmed to use a schema linking approach that can be updated to reflect changes in database schema. In one such embodiment, queries are expressed in a format including abstracted identifiers rather than actual database or field names. Schema linking configuration data is maintained (and updated) separately and used to provide up-to-date database and field names (or other attributes) when the query is ready for submission to the database server for execution. In some embodiments, updating of schema references may be incorporated into the query code generation of abstracted query module 150 by maintaining updated training data that reflects the current database schema. In such embodiments, an alternative submodule obtained by generating new query code from an annotation 406 may include updated schema references.

In further embodiments, query analysis module 350 may include instructions executable to generate additional query code submodules for obtaining data related to the data requested by structured query 402. Such additional submodules may be generated in some embodiments using inquiry step model 140. For example, query analysis module 350 could provide annotations 406 to inquiry step model 140, which could identify a request for inquiry that annotations 406 may be associated with. Upon identification of a request using a similar query sequence, query analysis module could then use inquiry step model 140 to identify any query code submodules mapped to the same request by analysis history data 166 that are not represented by annotations 406. Such additional submodules could be useful in providing related data to that sought by structured query 402. In some embodiments, use of inquiry step model 140 as described here includes interaction with inquiry plan module 130.

In the embodiment of FIG. 4A, query analysis module 350 adds query data 416 to the model training data stored in data storage 160. For example, some or all of submodules 404 or alternative submodules 412 may be added to query history 162. In some embodiments, only submodules actually submitted for execution on database 380 are stored in query history 162. In an embodiment, AST data corresponding to submodules added to query history 162 is added to query analysis data 164. In embodiments in which inquiry step model 140 is used, analysis history 166 may be updated.

Query analysis module 350 also includes instructions executable for submitting a query to database server 370 for execution on database 380. In some embodiments, a query such as structured query 402 may be submitted for execution after review of an auto-annotated version of the query or associated analysis results returned to a user system by query analysis module 350. In an embodiment, a query submitted for execution may be in the form of a suggested inquiry plan produced by a process similar to process flow 100 of FIG. 1. In such an embodiment, annotation and updating processes within process flow 400 as described above may not be needed. In some embodiments, a structured query such as query 402 may be submitted for analysis with instructions to continue to execution if certain testing operations are passed. Further query testing and analysis operations that may be performed using query analysis module 350 are described further in connection with FIGS. 8A-8B herein.

In submitting a query for execution, module 350 sends a query 418 to database server 370. If the query execution is successful, requested data 420 is received from server 370 and returned to user system 110 via user portal 120. In an embodiment, query 418 is an annotated query or an inquiry plan similar to plan 200 of FIG. 2A. If the query is unsuccessful, a notification to that effect (not shown) is instead received and returned to user system 110. Operations carried out using query analysis module 350 are believed to reduce the likelihood of unsuccessful queries, however. For example, auto-annotation of a received query using abstracted query model 150 provides input to the submitter of the query as to what operations execution of the query will implement. This may help in detection of logical errors in a query. Generation of alternative or additional query submodules may help in making submitted queries more correct and more thorough in obtaining useful information and avoiding follow-up queries.

Figure 4B:
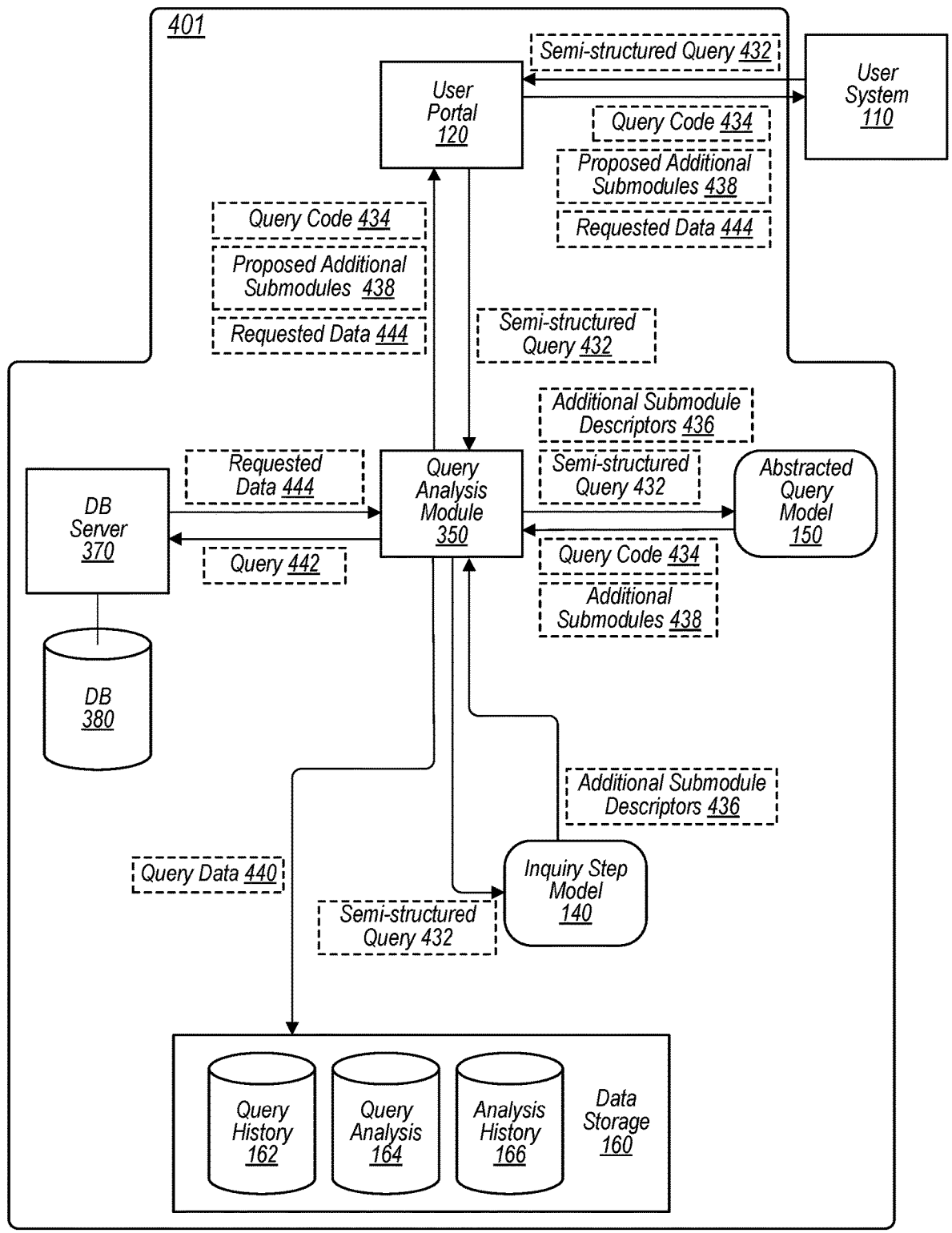

A data flow diagram illustrating still another process of using the disclosed solution is shown in FIG. 4B. Process flow 430 of FIG. 4B uses the same elements of database inquiry assistance system 401 as process flow 400 of FIG. 4A. In process flow 430, however, a different type of input is submitted by user system 110. Instead of submitting a structured query in query code format as in process flow 400, user system 110 in process flow 430 submits a semi-structured query 432 to user portal 120. In some embodiments, semi-structured query 432 is in the form of a natural-language step description, similar to step description 204 of FIGS. 2A and 214 of FIG. 2B. Semi-structured query 432 may also be a different type of descriptor for a query or query submodule. Semi-structured query 432 is not expressed in functional query code format, though it may in some embodiments contain one or more elements used in query code.

In the embodiment of FIG. 4B, user portal 120 determines that semi-structured query 432 is a semi-structured query rather than, for example, a request for an inquiry. As described above in the description of FIG. 4A, this determination may be made based on user input or by analysis of semi-structured query 432. Query 432 is forwarded to query analysis module 350. Because semi-structured query 432 is not in query code format, query analysis module 350 uses abstracted query model 150 to obtain query code 434 implementing the query corresponding to semi-structured query 432. Operation of abstracted query model 150 in process flow 430 is similar to operation of model 150 in process 100 of FIG. 1, in the sense that a non-query-code descriptor is provided to the model and corresponding query code is produced. In an embodiment, abstracted query model 150 generates an AST corresponding to the semi-structured query in the process of generating query code. Query code 434 is in some embodiments returned to user system 110 for review. In some embodiments query code 434 may instead be processed for submission to database server 370.

In some embodiments query analysis module 350 includes instructions executable to obtain additional queries or query submodules for obtaining data related to the data requested by semi-structured query 432. In an embodiment, such additional queries or submodules are generated using inquiry step model 140. As shown in FIG. 4B, query analysis module 350 may provide semi-structured query 432 to inquiry step model 140. In an embodiment, inquiry step model 140 is used to identify one or more requests for inquiry that semi-structured query 432 may be associated with. For example, query 432 may be compared to queries within sequences of queries mapped by model 140 to requests that can be responded to using the sequences of queries. Because a single query such as query 432 may appear within multiple sequences of queries corresponding to requests, model 140 may identify multiple requests associated with query 432. In an embodiment, model 140 may identify additional queries common to multiple requests associated with query 432, as a way of identifying additional queries relatively likely to be relevant to semi-structured query 432. Model 140 provides descriptors 436 of identified additional submodules. Query analysis module 350 can then obtain query code submodules 438 corresponding to descriptors 436 from abstracted query model 150. In an embodiment, query code submodules 438 are returned to user system 110 as proposed additional queries. In some embodiments, use of inquiry step model 140 as described here includes interaction with inquiry plan module 130.

Query analysis module 350 may add query data 440 to the model training data stored in data storage 160, in a manner similar to that described for query data 416 in FIG. 4A. For example, some or all of query code 434 and additional submodules 438 may be added to query history 162. In some embodiments, only submodules actually submitted for execution on database 380 are stored in query history 162. In an embodiment, AST data corresponding to submodules added to query history 162 is added to query analysis data 164. In embodiments in which inquiry step model 140 is used, analysis history 166 may be updated.

In a similar manner as discussed for process flow 400 in FIG. 4A, query code module 350 includes instructions executable for submitting a query for execution on database 380. In an embodiment, query 442 submitted to database server 370 includes query code 434. Query 442 may also include one or more of additional query code submodules 438 in some embodiments. Further query testing and analysis operations that may be performed by query analysis module 350 prior to submitting a query for execution are described further in connection with FIGS. 8A-8B herein. If execution of query 442 is successful, requested data 444 is received from server 370 and returned to user system 110 via user portal 120. If the query is unsuccessful, a notification to that effect (not shown) is instead received and returned to user system 110. Operations carried out using query analysis module 350 are believed to reduce the likelihood of unsuccessful queries, however. For example, use of a semi-structured query may prevent "dead" queries having invalid database schema references, since up-to-date query code may be obtained at the time the semi-structured query is submitted through use of abstracted query model 150. Moreover, generation of additional query submodules may help make submitted queries more thorough in obtaining relevant information.

The data flow diagrams of FIGS. 1, 4A and 4B provide examples of data flow during operation of a database inquiry assistance system as used herein. Separate flow diagrams are used for different types of input to the system in order to reduce drawing complexity, but it should be understood that one embodiment of a database inquiry assistance system can perform analyses as disclosed herein on multiple types of input. Either or both of the abstracted query model and inquiry step model as described herein, combined with one or both of the query analysis module and inquiry plan module, allow for multiple database query generation and analysis operations to be performed, depending on the type of input received and the types of analysis and processing desired.

Figure 5:
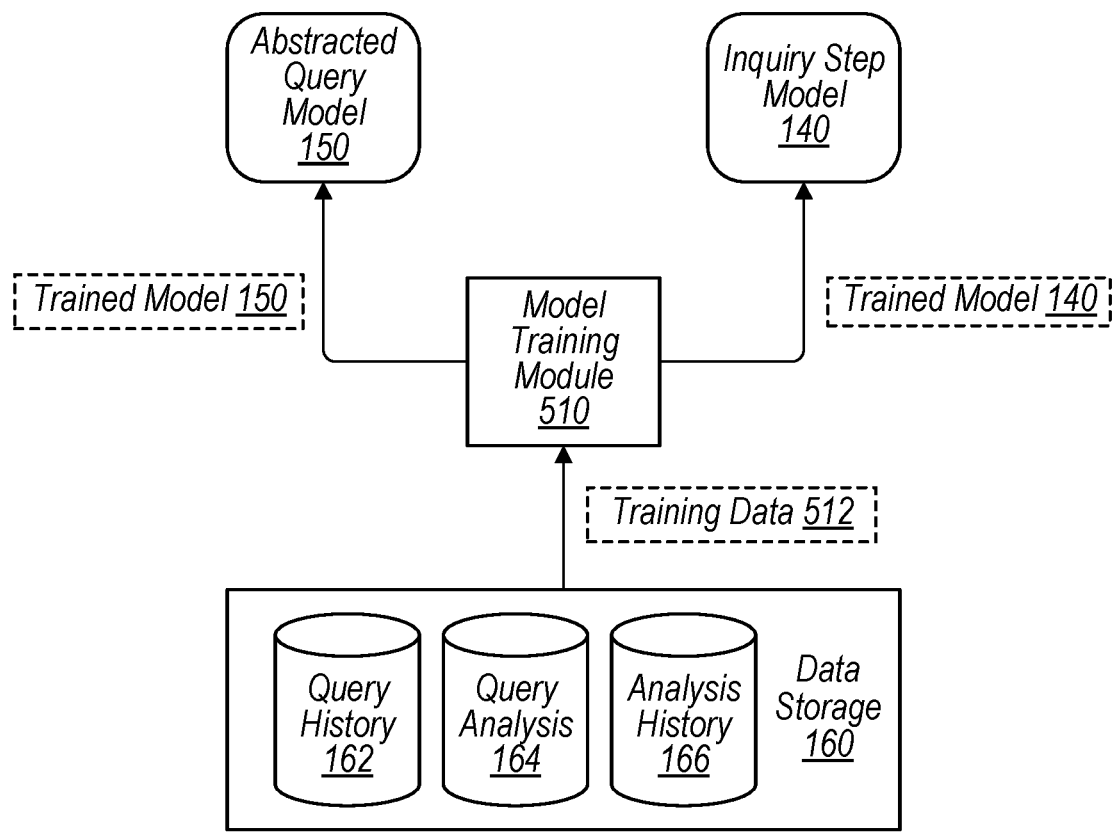
FIG. 5 is a data flow diagram illustrating data flow involving elements of a database inquiry assistance system during machine learning model training, according to some embodiments.

A data flow diagram illustrating data flows during training of machine learning models within a database inquiry assistance system is shown in FIG. 5. In process flow 500 of FIG. 5, model training module 510 uses training data 512 stored in data storage 160 to train abstracted query model 150 and inquiry step model 140, storing the trained models for use in operation of the database inquiry assistance system. In an embodiment, training data 512 includes data selected from query history data 162 which is used to train abstracted query model 150. In an embodiment in which abstracted query model 150 uses AST representations of queries, training data 512 includes data selected from query analysis data 164 for training model 150. Training data 512 may also include data selected from analysis history data 166 which is used to train inquiry step module 140. Although shown as a single module in FIG. 5, model training module 510 may be split into separate modules for training of the abstracted query model and inquiry step model, respectively.

In an embodiment, model training module 510 implements a supervised learning process. The model training process in such an embodiment generally includes using the model to determine a result based on the training data, comparing the determined result to a reference result, and adjusting model parameters and repeating the process until the model is trained to determine the result with acceptable accuracy. Specifics of the result and the model parameters depend on the particular machine learning algorithm used and the type of training data used. In an embodiment, model training is regularly repeated or at least updated so that changes to database organization, data stored, and queries used can be incorporated into model operation. Machine learning model effectiveness may be improved when a model is tuned for operation within a particular context. In an embodiment, abstracted query model 150 and inquiry step model 140 are trained for working with database query descriptions and code. In a further embodiment, the models are trained and tuned in the context of KYC inquiries involving a database.

In an embodiment, inquiry step model 140 is a text generative model, in which segments of text form the input and output of the model. One example of a text generative model is the GPT-3 model from Open AI, as described in "Language Models are Few-Shot Learners" by Tom B. Brown et al., arXiv:2005.14165v4 [cs:CL], Jul. 22, 2020, available at https://arxiv.org/abs/2005.14165v4. As used in process flow 100 of FIG. 1, for example, an input text segment for a text generative model implementing inquiry step model 140 would be the text of request for inquiry 112. Output text segments of such a model would be query descriptors 132.

In an embodiment, abstracted query model 150 includes a sequence-to-sequence machine learning model for converting one sequence (of words, for example) to another. In a further embodiment, the sequence-to-sequence model converts between an AST representation of a query code submodule and a natural-language description of the submodule. In such an embodiment, conversion between query code and its AST representation may be performed using a separate process or algorithm. AST representations are often used by code compilers and routines for converting query code to its AST representation are available.

For converting from query code to natural language descriptions, publicly available libraries may be used to obtain an AST representation of the code. An example of a program for generating an AST representation of SQL code is sqlparser, available at https://github.com/sqlparser-rs/sql-parser-rs. A sequence-to-sequence machine learning model may then be used to transform the AST representation to a natural language description. In such an embodiment, model training module 510 may compare the description result to analyst-generated comments describing query code in query history 162 while adjusting parameters to train the sequenceto-sequence model. An example of a model using an AST representation to convert from code to natural language descriptions is code2seq, as described in "code2seq: Generating Sequences from Structured Representations of Code," by Uri Alon et al, arXiv:1808.01400v6 [cs.LG], Feb. 21, 2019, available at https://arxiv.org/abs/1808.01400v6. For converting from a natural language description to an AST representation, a schema linking approach using a set of pre-defined schema elements (such as table and column names) is used in some embodiments. An example of a schema linking approach is described in "Re-examining the Role of Schema Linking in Text-to-SQL," by Wenqiang Lei et al., Proc. 2020 Conf. on Empirical Methods in Natural Language Processing, pp. 6943-6954, Nov. 16-20, 2020, available at https://aclanthology.org/2020.emnlp-main.564/. In such an embodiment, model training module 510 may compare an AST computed from a natural-language description using the schema linking approach to the AST derived from the functional code corresponding to the natural-language description.

Figure 6:
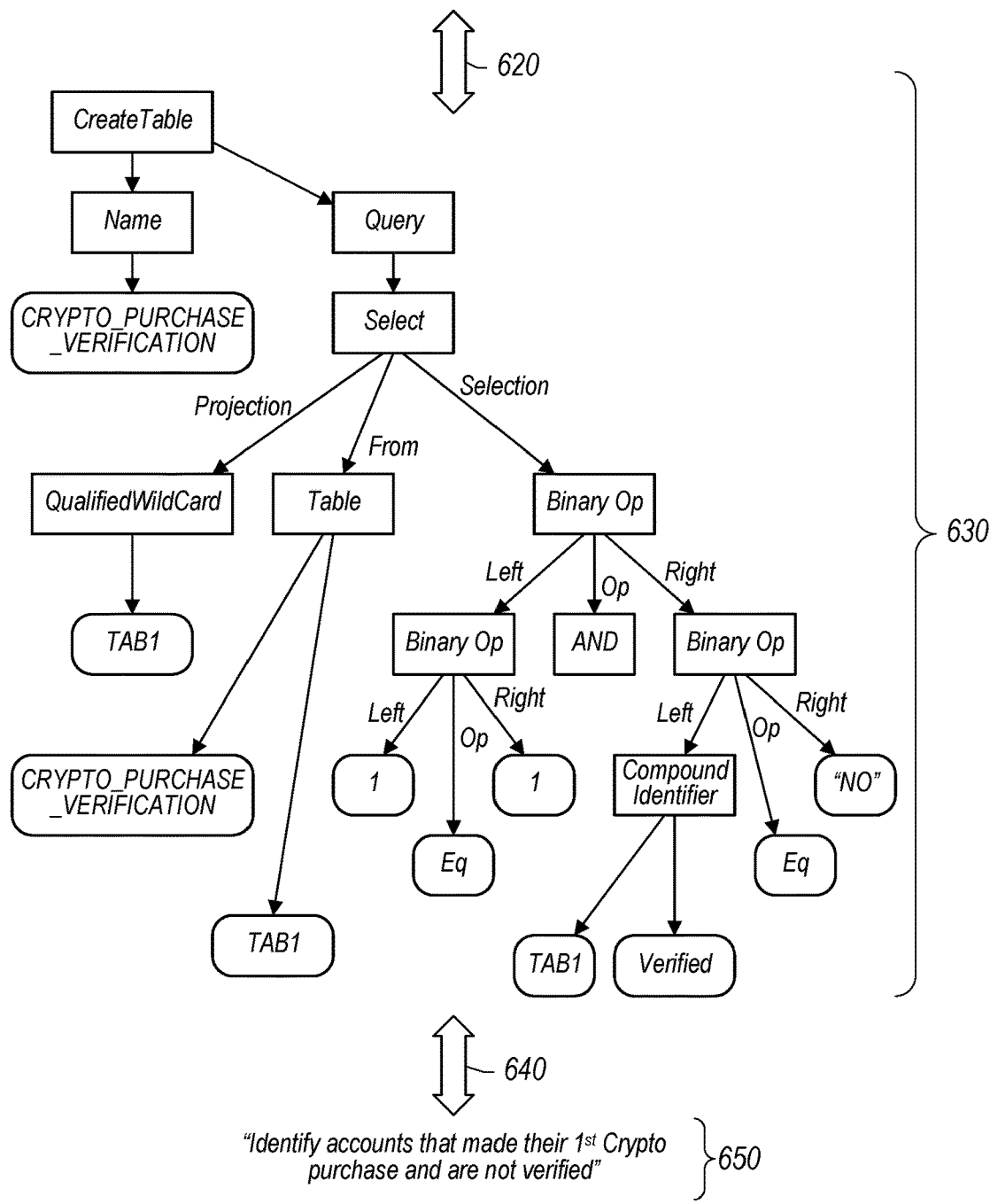
FIG. 6 illustrates an example abstract syntax tree (AST) representation of database query code, according to some embodiments.

An example illustrating conversion between a query code submodule and a natural language description of the submodule using an AST representation is shown in FIG. 6. In conversion example 600 of FIG. 6, a query code submodule 610 is converted to an AST 630 using a conversion process 620. AST 630 is converted to natural-language step description 650 using conversion process 640. In AST 630, functions such as "Create Table" or "Select" are represented as nodes or a root of the tree, depicted using square-cornered rectangular blocks. Variable values such as "TAB 1" or "NO" are represented as leaves of the tree, depicted using blocks with rounded corners. Operation of abstracted query model 150 as used in process flow 100 of FIG. 1 could be implemented using the conversion process of FIG. 6 operating from bottom to top of the drawing: a natural-language descriptor is converted to query code using an AST representation. Use of abstracted query model 150 for automatic annotation as shown in FIG. 4A, on the other hand, could be implemented using the conversion process of FIG. 6 running from top to bottom: a query code submodule 404 is converted to a natural-language annotation using an AST representation.

FIGS. 7A-7C are tables illustrating examples of machine learning model training data, according to some embodiments. Query history data structure 700 of FIG. 7A illustrates one embodiment of a data structure for query history data 162 (a single row is displayed for purposes of brevity). Fields in data structure 700 include query identifier (ID) 702, query description 704, query code 706, query status 708, query execution time 710, user ID 712 and date/time 714. In the embodiment of FIG. 7A, query ID 702 identifies a query that has been executed on the database. In an embodiment, each query execution receives a unique query ID, even if the same query code has been executed previously. Query description 704 includes a description of the query. In an embodiment, description 704 is a natural-language step description like step descriptions 204 of FIGS. 2A and 214 of FIG. 2B. Query code 706 includes the query code run when executing the query, in a database query code format. In the example shown, query ID 1234 corresponds to description 650 and query code submodule 610 of FIG. 6. Query code 706 for query ID 1234 is only partly displayed for purposes of brevity, as indicated by an ellipsis ( . . . ). Query status 708 includes an indicator of whether the query executed successfully, and execution time 710 includes the time the query took to execute, if successful. User ID 712 identifies a user associated with the query, such as a user submitting the query for execution. Date/time 714 includes a timestamp for execution of the query.

Query analysis data structure 720 of FIG. 7B illustrates one embodiment of a data structure for query analysis data 164 (a single row is displayed for purposes of brevity). Fields in data structure 720 include query ID 702 and serialized AST 722. Query ID 702 ties the AST data in data structure 720 to query data in data structure 700 of FIG. 7A. Serialized AST 722 includes a serialized version of an abstract syntax tree for the query identified by query ID 702. In the example shown, query ID 1234 corresponds to AST 630 of FIG. 6, and an initial portion of a serialized version of AST 630 is displayed. Serialized ASTs are generally formed by traversing the AST in a specified order while indicating root, node and leaf names. The representation shown in data structure portion 720 illustrates one possible example of a serialization format.

Analysis history data structure 730 of FIG. 7C illustrates one embodiment of a data structure for analysis history data 166 (only two rows are displayed for purposes of brevity). Fields in data structure 730 include inquiry ID 732, inquiry details 734 and analysis details 742. Inquiry details 734 include request description 736, request time 738 and request status 740. Analysis details 742 include user ID 712, query list 746 and query description list 748. In the embodiment of FIG. 7C, inquiry ID 732 identifies an inquiry carried out using the database, where the inquiry may be in the form of, for example, investigation of an incident or fulfilment of a request for specific data. Request description 736 includes a description of a request initiating the inquiry. In the example of FIG. 7C, inquiry ID 8765 corresponds to the request described in request 212 of FIG. 2B, while inquiry ID 8907 corresponds to an example of a description of an incident involving transaction processing. Request time 738 includes a timestamp for the request, such as a date and time the request is received. User ID 712 identifies a user associated with the inquiry, such as an analyst or engineer submitting the request. Query list 746 includes a list of query IDs identifying a sequence of queries for responding to the request. In an embodiment, each query ID within a query list 746 is included in a respective row of query history data structure 700 that is not shown in FIG. 7A. Query description list 748 includes descriptions corresponding to queries represented by query IDs in query list 746. In an embodiment, query descriptions within query description list 748 match corresponding query descriptions 704 in query history data structure 700 of FIG. 7A. In the example of FIG. 7C, query ID 2345 corresponds to query code submodule 216 in FIG. 2B, and the first description in query description list 748 for inquiry ID 8765 matches step description 214 of FIG. 2B.

Data stored using data structures 700, 720 and 730 of FIGS. 7A-7C is used for training inquiry step model 140 and abstracted query module 150. For example, request descriptions 736 as shown in FIG. 7C may form input requests for inquiry step model 140. Query description lists 748 may form output descriptors received from inquiry step model 140, such as descriptors 132 of FIG. 1. In another embodiment, inquiry step model 140 may provide a sequence of queries in a different form, such as a list 746 of query identifiers. Query code 706 may form either an input or an output of abstracted query model 150, depending on which direction the model is operated in for a particular application of the disclosed database inquiry assistance system. In an embodiment for which a submodule of query code 706 is an input to model 150, a corresponding query description 704 is an output of the model. In embodiments for which abstracted query model 150 employs an AST representation of a query, serialized AST data 722 is used in converting between model inputs and outputs. Other data fields, such as status and performance data for query execution or inquiry resolution, may be used in selecting subsets of the training data to be used in training or updating a model. In the example of FIGS. 7A-7C, query ID 702 connects query code and other query details in data structure 700 with AST representation data in data structure 720 and inquiry information in data structure 730. The data structures and fields shown in FIGS. 7A-7C are merely an example. More, fewer or different fields may be used in some embodiments, and different data structure organizations may be used. One data structure could be split into multiple data structures in some embodiments, or multiple data structures may be combined into a single structure.

Figure 8A:
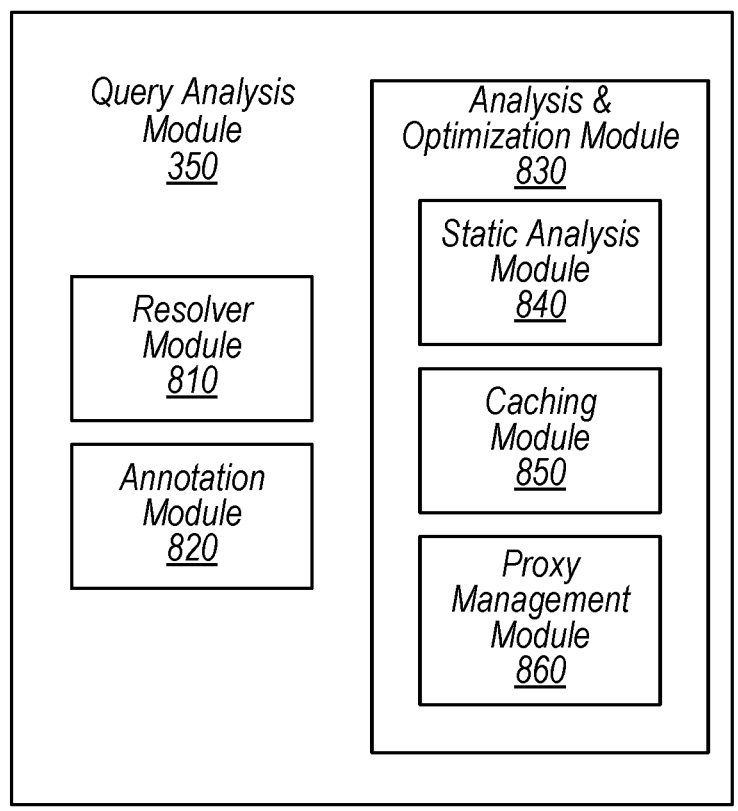
FIG. 8A is a block diagram illustrating an example of a query analysis module of a database inquiry assistance system, according to some embodiments.

FIG. 8A is a block diagram illustrating components of an embodiment of query analysis module 350, as described in connection with FIGS. 3-4B above. In this embodiment, query analysis module 350 includes a resolver module 810, an annotation module 820 and an analysis and optimization module 830. Analysis and optimization module 830 further includes a static analysis module 840, a caching module 850 and a proxy management module 860. Resolver module 810 includes instructions executable to convert a semi-structured query or other query descriptor to query code for executing the query. Module 810 uses abstracted query model 150 to perform this conversion, in a similar manner to that discussed in connection with process flow 100 of FIG. 1 and process flow 430 of FIG. 4B. Annotation module 820 includes instructions executable to auto-annotate a structured query received in query code format. Module 820 uses abstracted query model 150 to perform this conversion, in a similar manner to that discussed in connection with process flow 400 of FIG. 4A.

Analysis and optimization module 830 includes instructions executable to perform additional local testing of queries in query code format before they are submitted to the database for execution. In an embodiment, a query received by module 830 has been generated using resolver module 850 or inquiry plan module 130 or has been annotated using annotation module 820. Such a query may be submitted by a user system 110 after review of the query generation and/or annotation in some embodiments. In other embodiments, a query may be received by module 830 directly from one of modules 810, 820 or 130. Static analysis module 840 includes instructions executable to perform static analysis for validating a query's syntax and logical correctness and estimating an impact of the query on database performance. In an embodiment, the static analysis includes translation of a query into first-order logic form. If a query is found to have errors of syntax or logic or is predicted to have an adverse impact on database performance, the query, or an error message concerning the query, may be returned to user system 110 instead of submitting the query for execution or performing other additional processing.

Caching module 850 includes instructions executable to implement a local cache for speeding up query execution and reducing load on database server 370 and database 380. In some embodiments module 850 detects frequently requested portions, such as tables, columns or views, of the database and stores them in the local cache so that similar queries can be satisfied from the cache rather than requiring a call to the database. A suggested inquiry plan generated by inquiry plan module 130, such as plan 136 of FIG. 1, may in some embodiments be provided to caching module 850 for analysis of fetching patterns in the plan and pre-fetching of selected data before a corresponding query is received for execution. In an embodiment, such analysis and prefetching occur while an inquiry plan is being reviewed by the user submitting the request resulting in the plan. Local query evaluation and caching implemented by modules 840 and 850 is separate from and in addition to any evaluation, caching and optimization that may be performed by a database server such as server 370. Local caching may be particularly helpful when an organization's server system is distributed such that a database is at remote geographic location from a user requesting data from the database.

Figure 8B:
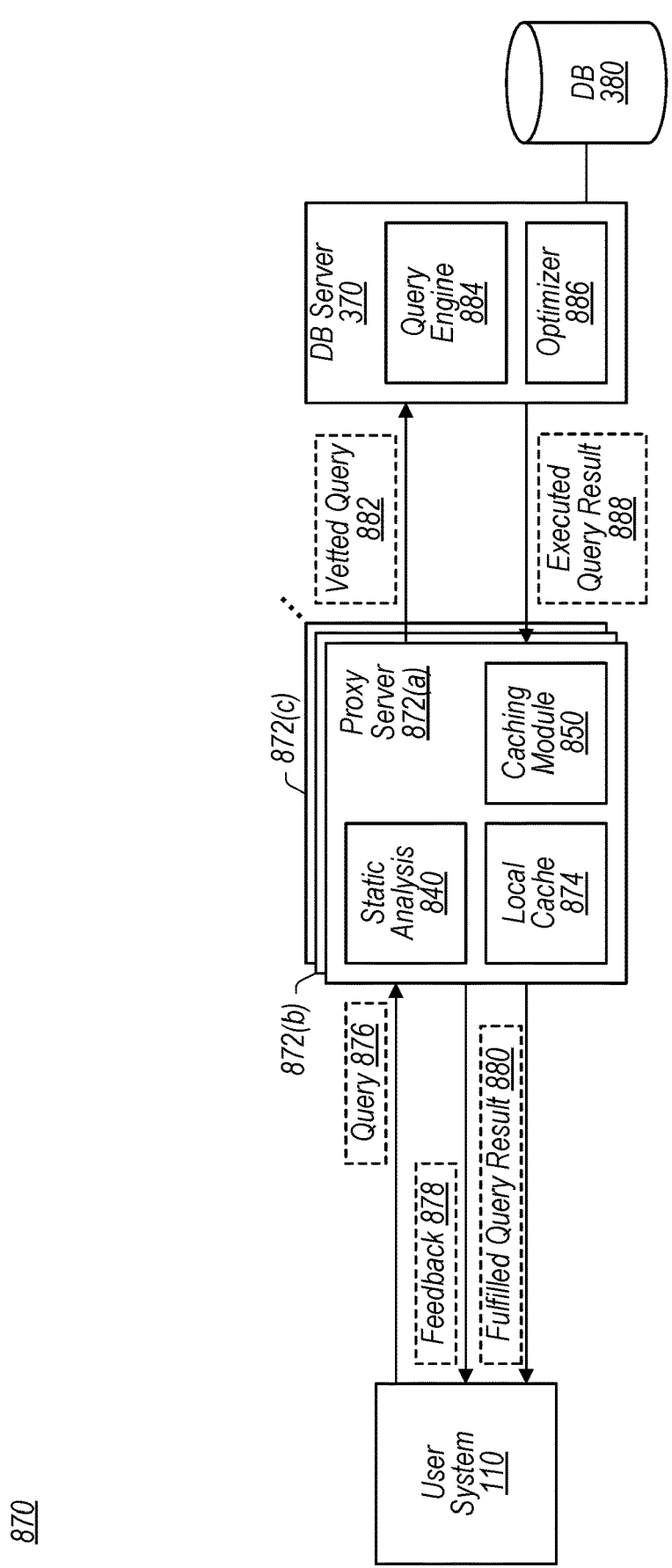
FIG. 8B is a data flow diagram illustrating data flow involving elements of a query analysis module, according to some embodiments.

Proxy management module 860 includes instructions executable to implement one or more proxy servers between a user and the database server. By implementing static analysis and caching to filter out faulty or redundant queries to the database, analysis and optimization module 830 acts as a proxy between the user and the database server. In an embodiment, proxy management module 860 implements multiple proxy servers carrying out functions of analysis and optimization module 830, which may further reduce loading of the database and database server. A data flow diagram illustrating operation of an embodiment of the disclosed proxy server implementation is shown in FIG. 8B. In process flow 870 of FIG. 8B, a user system 110 sends a query 876 to a proxy server 872(a) implementing static analysis module 840 and caching module 850 and storing a local cache 874. Additional proxy servers including servers 872(b) and 872(c) are configured in a similar manner and can receive other queries submitted by user system 110 or by other user systems not shown. If evaluation by static analysis module 840 indicates that query 876 should not be executed, feedback 878 is sent to user system 110. If static analysis shows the query to be sound, caching module 850 can check local cache 874 for data satisfying the query. If local data is not available, vetted query 882 (having passed evaluation by proxy server 872(a)) is submitted to database server 370. In the embodiment of FIG. 8B, database server 370 includes instructions executable to implement a query engine 884 and optimizer 886. If vetted query 882 is successfully executed, executed query result 888 is returned to proxy server 872(a). Fulfilled query result 880 returned to user system 110 by proxy server 872(a) may include executed query result 888, a result obtained from local cache 874, or a combination of these. Operation of analysis and optimization module 830 can potentially improve speed and efficiency of database query fulfillment, both by reducing load on the database from unsound or redundant queries so that queries executed on the database can be executed more quickly and by fulfilling certain queries more quickly using a local cache.

EXAMPLE METHODS

Figure 9:
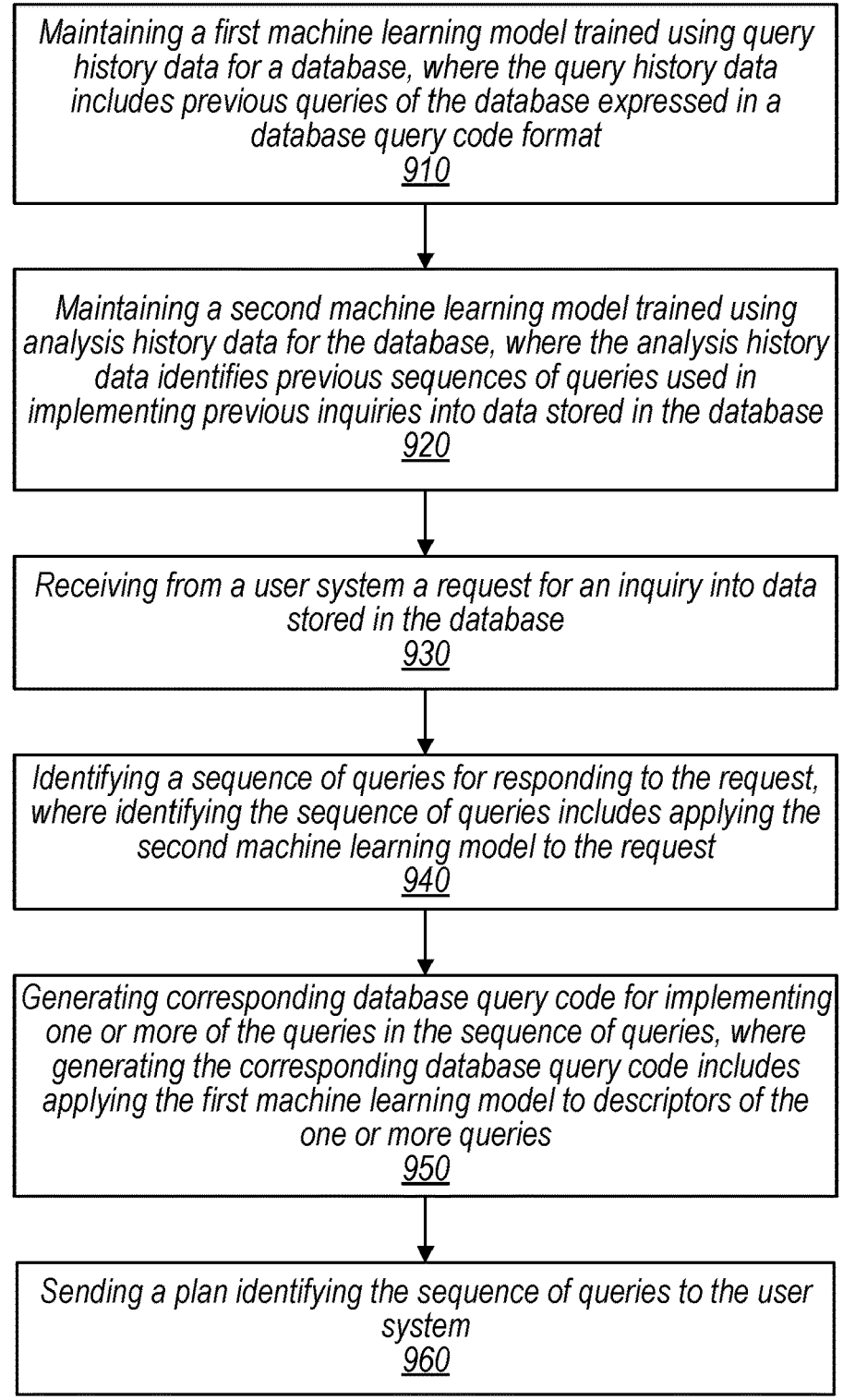
FIG. 9 is a flow diagram illustrating an example method for automatically generating an inquiry plan, according to some embodiments.

FIG. 9 is a flow diagram illustrating an example method for automatically generating an inquiry plan using a database query assistance system as disclosed herein. In various embodiments, method 900 may be performed by a database query assistance system including an inquiry plan module, such as system 105 of FIG. 1 or system 310 of FIG. 3. For example, a computer system or server system implementing a database query assistance system as disclosed herein may include or have access to a non-transitory computer-readable medium having program instructions stored thereon that are executable by the computer system to cause the operations described with reference to FIG. 9.

Method 900 includes, at step 910, maintaining a first machine learning model trained using query history data for a database, where the query history data includes previous queries of the database expressed in a database query code format. In an embodiment, maintaining a machine learning model includes storing on a computer-readable medium, such as a memory, instructions executable by a computer system to implement the model. An example of a first machine learning model trained using query history data for a database is abstracted query model 150 as described herein. An example of the query history data including previous queries of the database is query history data 162 as described herein. Method 900 further includes, at step 920, maintaining a second machine learning model trained using analysis history data for the database, where the analysis history data identifies previous sequences of queries used in responding to previous inquiries into data stored in the database. An example of a second machine learning model trained using analysis history data for the database is inquiry step model 140 as described herein, while an example of the analysis history data is analysis history data 166.

At step 930, method 900 includes receiving from a user system a request for an inquiry into data stored in the database. Examples of a request for inquiry include request 112 described in connection with FIG. 1 and request 212 described in connection with FIG. 2B. Method 900 continues in step 940 with identifying a sequence of queries for responding to the inquiry, where identifying the sequence of queries includes applying the second machine learning model to the request. In an embodiment, the sequence of queries includes database queries that if executed on the database in the order of the sequence would implement a response to the query. Considering the example of FIG. 7C, for a request to confirm that customers had CIP-verified status before purchasing cryptocurrency between Apr. 1, 2020 and Mar. 31, 2021, a sequence of queries identified in step 940 could be a sequence beginning with the four queries corresponding to query identifiers 2345, 2341, 3216 and 4378, as shown in query list 746 for inquiry ID 8765 in analysis history data structure 730. In an embodiment, the identified queries, if executed, would result in retrieval of the information requested. As another example, for the case corresponding to inquiry ID 8907 in FIG. 7C, in which the request involves an incident in which a transaction rule is incorrectly applied, a sequence of queries identified in step 940 of method 900 could be a sequence beginning with the four queries corresponding to query identifiers 4321, 5123, 2456 and 4123. In an embodiment, execution of these queries would result in information useful in investigating the incident.

At step 950, method 900 includes generating corresponding database query code for implementing one or more of the queries in the sequence of queries, where generating the corresponding database query code includes applying the first machine learning model to descriptors of one or more of the queries. In an embodiment, a descriptor of a query is a natural-language description of the query. Examples of such a description include step description 214 discussed in connection with FIG. 2B and description 650 discussed in connection with FIG. 6. Examples of corresponding database query code include code in submodule 216 of FIG. 2B (corresponding to description 214) and code in submodule 610 of FIG. 6 (corresponding to description 650). Method 900 ends at step 960 with sending to the user system a plan identifying the sequence of queries. In an embodiment, a plan identifying the sequence of queries includes a list of descriptors for the queries in the sequence. One example of such a list of descriptors is a list of natural-language step descriptions such as those in query description list field 748 of FIG. 7C. Another example of a list of descriptors is a list of query identifiers, such as those in query list field 746 of FIG. 7C. In a further embodiment, a plan identifying the sequence of queries includes query code implementing the queries in the sequence. In still another embodiment, a plan includes a combination of descriptors and corresponding query code, like inquiry plans 136 of FIG. 1 and 200 of FIG. 2A.

In some embodiments a method for generating inquiry plan such as method 900 may be extended with additional steps, including steps of adding data from the generated plan to the model training data or steps of receiving feedback from the user device as to the suitability of the plan. A query based on an inquiry plan generated using method 900 may be processed for submission to the database for execution. In an embodiment, such processing may include evaluating syntax or logical soundness of the query. Processing for submission to the database may also include checking a local cache for data sought by the query.

Automatic generation of a suggested inquiry plan as provided by method 900 may allow a user to benefit from the experience of others who have performed similar inquiries. The automatically generated inquiry plan may include a more thorough and appropriate sequence of queries than a user would come up with on their own, and automatic generation of query code within the plan may provide queries that are logically correct and use updated database schema references.

Figure 10:
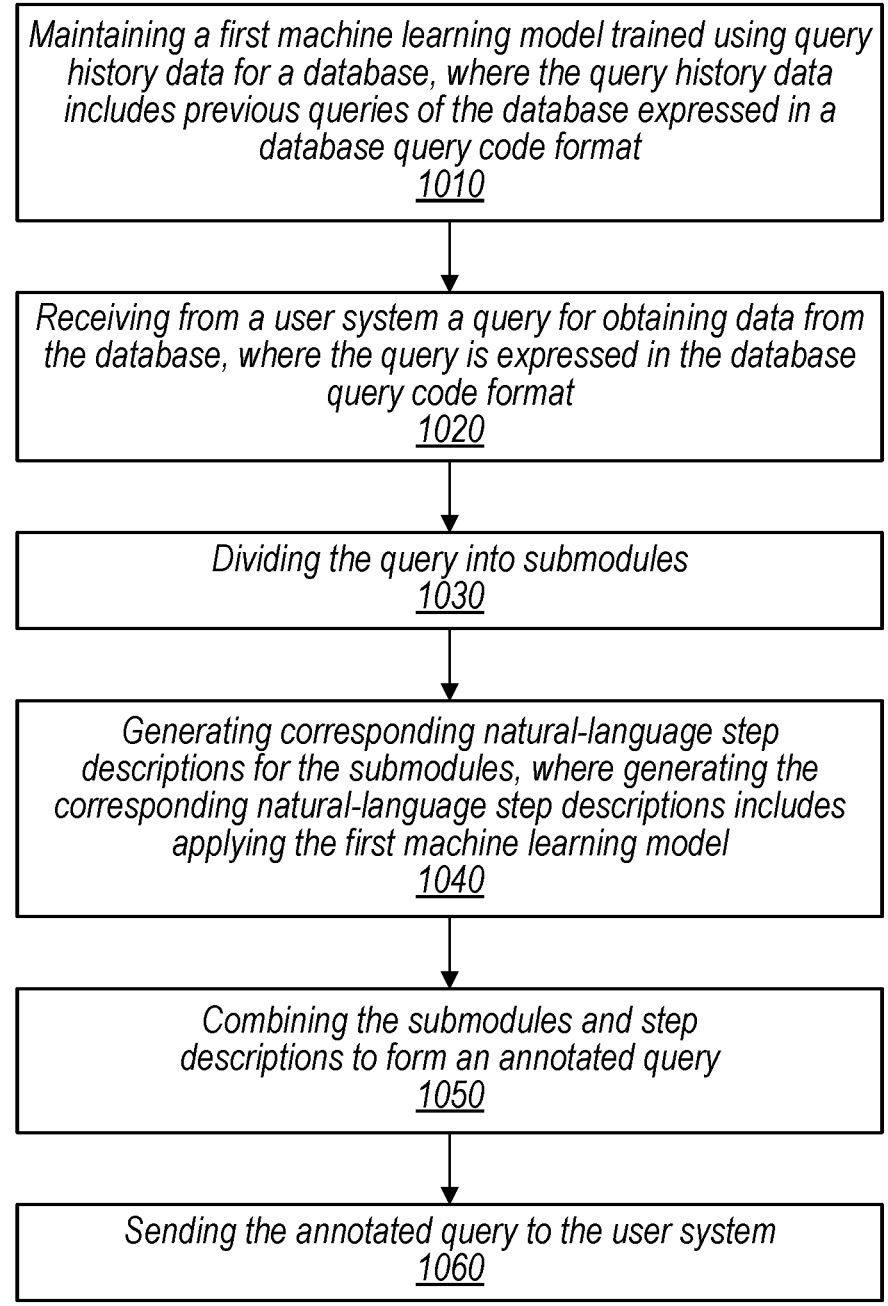
FIG. 10 is a flow diagram illustrating an example method for automatically annotating a query, according to some embodiments.

A flow diagram illustrating an embodiment of a method for automatically annotating a query is shown in FIG. 10. In various embodiments, method 1000 may be performed by a database query assistance system including a query analysis module, such as system 310 of FIG. 3 or system 401 of FIGS. 4A-4B. For example, a computer system or server system implementing a database query assistance system as disclosed herein may include or have access to a non-transitory computer-readable medium having program instructions stored thereon that are executable by the computer system to cause the operations described with reference to FIG. 10.

Method 1000 includes, at step 1010, maintaining a first machine learning model trained using query history data for a database, where the query history data includes previous queries of the database expressed in a database query code format. In an embodiment, maintaining a machine learning model includes storing on a computer-readable medium, such as a memory, instructions executable by a computer system to implement the model. An example of a first machine learning model trained using query history data for a database is abstracted query model 150 as described herein. An example of the query history data including previous queries of the database is query history data 162 as described herein. At step 1020, method 1000 includes receiving from a user system a query for obtaining data from the database, where the query is expressed in the database query code format. Method 100 continues at step 1030 with dividing the received query into submodules. A submodule as used herein is a subset of a query expressed in query code format. In an embodiment, a submodule corresponds to a segment of code for implementing a single step in a multi-step process implemented using database queries. In another embodiment, a submodule includes a single command in the query code language used. Examples of submodules include submodules 216 of FIGS. 2B and 610 of FIG. 6.

In step 1040, method 1000 includes generating corresponding natural-language step descriptions for the submodules, where generating the step descriptions includes applying the first machine learning model. Examples of corresponding natural-language step descriptions include description 214 of FIG. 2A (corresponding to submodule 216) and description 650 of FIG. 6 (corresponding to submodule 610). Method 100 continues in step 1050 with combining the submodules and step descriptions to form an annotated query and in step 1060 with sending the annotated query to the user system. In an embodiment, the annotated query includes a listing of the submodules in their order in the received query, with step descriptions interposed between the submodules so that each description is immediately followed by its corresponding submodule. Such an embodiment has a format similar to that of inquiry plan 200 in FIG. 2A, except that each step description 204 would correspond to a single query code submodule 206.

In additional embodiments, a method such as method 1000 for annotating a query may include additional steps, including steps for identifying alternative submodules for obtaining the data sought by the received query or steps for identifying additional submodules for obtaining data related to the data sought by the received query. Identifying alternative submodules may in some embodiments include updating invalid field or table names. In an embodiment, identifying alternative submodules includes transforming the step descriptions back to database query code format. Further discussion of identifying alternative submodules and additional submodules is provided in connection with FIG. 4A. A query annotated using method 1000 may be processed for submission to the database for execution. In an embodiment, such processing may include evaluating syntax or logical soundness of the query. Processing for submission to the database may also include checking a local cache for data sought by the query.

Automatic query annotation as provided by method 1000 may assist a submitter of the query in checking to see that the query achieves its intended result. Annotations generated automatically may be compared to annotations submitted with the original query in some embodiments.

A flow diagram illustrating an embodiment of a method for automatically updating a query is shown in FIG. 11. In various embodiments, method 1100 may be performed by a database query assistance system including a query analysis module, such as system 310 of FIG. 3 or system 401 of FIGS. 4A-4B. For example, a computer system or server system implementing a database query assistance system as disclosed herein may include or have access to a non-transitory computer-readable medium having program instructions stored thereon that are executable by the computer system to cause the operations described with reference to FIG. 11.

Steps 1110, 1120, 1130 and 1140 of method 1100 are the same as steps 1010, 1020, 1030 and 1040 of method 1000 in FIG. 10. Each method includes maintaining a first machine learning model, receiving a query in query code format, dividing the query into submodules and generating corresponding natural-language step descriptions for the submodules. But while method 1000 continues with combining the submodules and natural language descriptions to form an annotated query, method 1100 continues, in step 1150, with generating corresponding updated database query code for one or more of the natural-language step descriptions. Generating the updated database query code includes applying the first machine learning model. The updated database query code is sent to the user system in step 1160. An example of the first machine learning model of method 1100 is abstracted query model 150. In an embodiment, the updated database query code is sent to the user system as part of an annotated query with updated submodules substituted for corresponding original submodules. In another embodiment, updated query code is sent to the user system in the form of proposed alternative modules in a set of query analysis results. Use of abstracted query model 150 to generate new database query code using natural language step descriptions corresponding to submodules of the original query may allow more efficient submodules producing the same result to be obtained. The new database query may also include automatically updated database schema references, so that invalid queries are avoided.

While the elements in the methods of FIGS. 9-11 are shown in a particular order for ease of understanding, other orders may be used. In various embodiments, some of the method elements may be performed concurrently, in a different order than shown, or may be omitted. Additional method elements may also be performed.

Example Computer System

Figure 12:
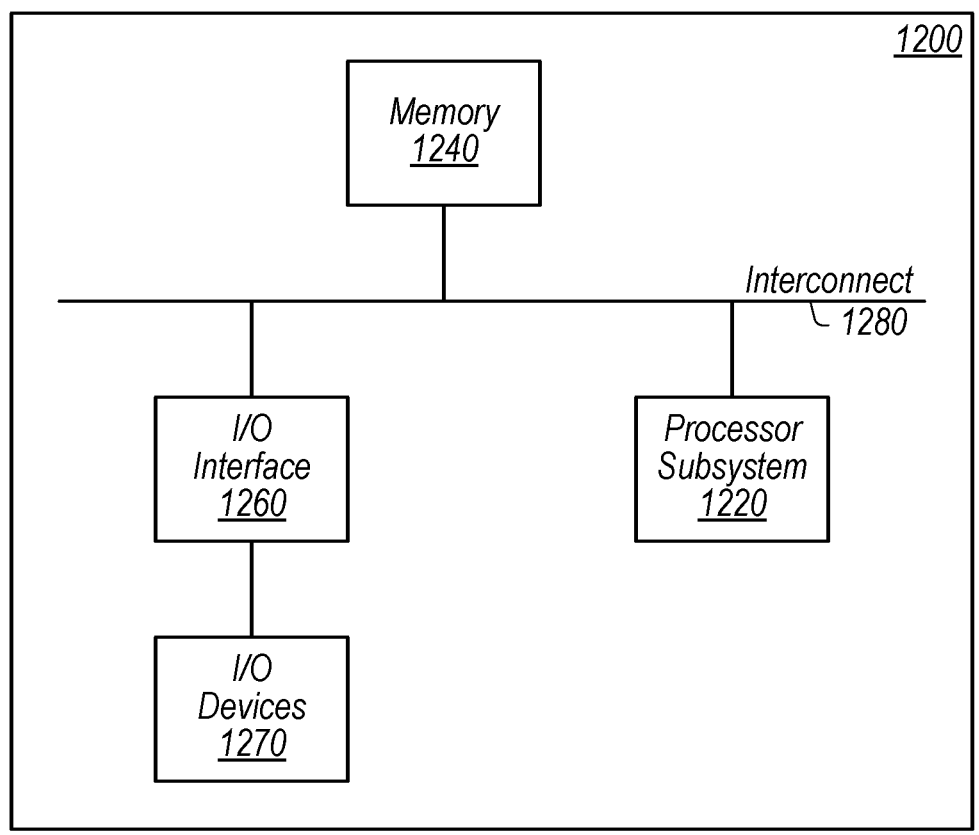
FIG. 12 is a block diagram illustrating an example computer system, according to some embodiments.

FIG. 12 is a block diagram of an example computer system that may implement one or more systems as disclosed herein, such as user system 110, database inquiry assistance systems 105, 310 or 401, or database server 370, according to various embodiments. Computer system 1200 includes a processor subsystem 1220 that is coupled to a system memory 1240 and I/O interfaces(s) 1260 via an interconnect 1280 (e.g., a system bus). I/O interface(s) 1260 is coupled to one or more I/O devices 1270. Computer system 1200 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 1200 is shown in FIG. 12 for convenience, computer system 1200 may also be implemented as two or more computer systems operating together.

Processor subsystem 1220 may include one or more processors or processing units. In various embodiments of computer system 1200, multiple instances of processor subsystem 1220 may be coupled to interconnect 1280. In various embodiments, processor subsystem 1220 (or each processor unit within 1220) may contain a cache or other form of on-board memory.

System memory 1240 is usable to store program instructions executable by processor subsystem 1220 to cause computer system 1200 perform various operations described herein. System memory 1240 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1200 is not limited to primary storage such as system memory 1240. Rather, computer system 1200 may also include other forms of storage such as cache memory in processor subsystem 1220 and secondary storage on I/O devices 1270 (e.g., a hard drive, storage array, etc.). In some embodiments, these other forms of storage may also store program instructions executable by processor subsystem 1220.

I/O interfaces 1260 may be any of various types of interfaces configured to couple to and communicate with other devices, according to various embodiments. In one embodiment, I/O interface 1260 is a bridge chip (e.g., Southbridge) from a front-side to one or more back-side buses. I/O interfaces 1260 may be coupled to one or more I/O devices 1270 via one or more corresponding buses or other interfaces. Examples of I/O devices 1270 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 1270 includes a network interface device (e.g., configured to communicate over WiFi, Bluetooth, Ethernet, etc.), and computer system 1200 is coupled to a network via the network interface device.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]— is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

"In this disclosure, various "modules" operable to perform designated functions are shown in the figures and described in detail (e.g., query analysis module 350). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

What is claimed is:

1. A method, comprising:
    receiving, at a computer system and from a user system, an inquiry into data stored in a database accessible by the computer system using a database query code format, wherein the inquiry is not in the database query code format;
    generating a set of descriptors for a sequence of two or more queries corresponding to the inquiry, wherein generating the set of descriptors includes executing, by a processor of the computer system, a text generative machine learning model trained using analysis history data selected based at least in part on performance characteristics for previous query execution using the database;
    executing, by the computer system, a sequence-to-sequence machine learning model in a first direction to produce corresponding database query code for the set of descriptors, wherein the sequence-to-sequence machine learning model is trained using query history data selected based at least in part on performance characteristics for previous query execution using the database;
    executing, by the computer system, the sequence-to-sequence machine learning model again, in a reverse direction as compared to the first direction, to generate one or more alternative query code submodules corresponding to the set of descriptors;
    transmitting annotated queries, generated based on the one or more alternative query code submodules, to the user system; and
    submitting, in response to receiving input from the user system for the annotated queries, at least a portion of the corresponding database query code to a database server for execution using the database.

2. The method of claim 1, further comprising sending to the user system a suggested inquiry plan including the set of descriptors.

3. The method of claim 2, wherein sending the suggested inquiry plan includes sending the corresponding database query code.

4. The method of claim 1, wherein the inquiry includes incident details for a transaction using the database.

5. The method of claim 1, further comprising updating the analysis history data to reflect the sequence of queries.

6. The method of claim 1, wherein executing the sequence-to-sequence machine learning model includes generating abstract syntax trees (ASTs) corresponding to the descriptors of the set of descriptors.

7. The method of claim 6, wherein the sequence-to-sequence machine learning model is further trained using query analysis data, and wherein the query analysis data includes query identifiers and corresponding abstract syntax tree (AST) data for queries represented in the query history data.

8. A method, comprising:
receiving, at a computer system and from a user system, a sequence of multiple queries for obtaining data from a database accessible by the computer system using a database query code format, wherein the sequence of multiple queries is expressed in the database query code format;
executing, by a processor of the computer system, a sequence-to-sequence machine learning model in a first direction to generate corresponding natural-language step descriptions for submodules of the queries in the sequence, wherein the sequence-to-sequence machine learning model is trained using query history data selected based at least in part on performance characteristics for previous query execution using the database;
executing, by the processor, the sequence-to-sequence machine learning model again, in a reverse direction as compared to the first direction, to generate one or more alternative query code submodules corresponding to the natural-language step descriptions;
sending annotated queries including the submodules, the one or more alternative query code submodules, and the natural-language step descriptions to the user system;
receiving from the user system a request for execution of at least a portion of the annotated queries or a revised query; and
submitting the at least a portion of the annotated queries or the revised query to a database server for execution using the database.

9. The method of claim 8, wherein the performance characteristics include an execution time for a previously-executed query of the database.

10. The method of claim 8, wherein the alternative query code submodules include updated field or table names.

11. The method of claim 8, further comprising:
executing by the processor a text generative machine learning model to generate one or more additional query code submodules associated with the natural-language step descriptions, wherein the one or more additional query code submodules are executable for obtaining related data from the database, and wherein the text generative machine learning model is trained using analysis history data selected based at least in part on performance characteristics for previous query execution using the database; and
sending the one or more additional query code submodules to the user system.

12. The method of claim 8, further comprising checking a local cache for data sought by the sequence of queries.

13. A system, comprising:
at least one processor; and
a non-transitory, computer-readable medium having instructions stored thereon that are executable by the at least one processor to implement:
a sequence-to-sequence machine learning model trained using query history data for a database accessible by the system using a database query code format, wherein the query history data includes previous queries of the database expressed in the database query code format, and wherein the sequence-to-sequence machine learning model is trained using training data selected from the query history data based at least in part on performance characteristics for previous query execution using the database,
a text generative machine learning model trained using analysis history data for the database, wherein the analysis history data relates previous sequences of two or more queries to previous inquiries into data stored in the database, and wherein the text generative machine learning model is trained using training data selected from the analysis history data based at least in part on performance characteristics for previous query execution using the database,
a query analysis module programmed to execute the sequence-to-sequence machine learning model (a) in a first order to generate database query code corresponding to received natural-language step descriptions and (b) in a reverse order to generate natural-language step descriptions corresponding to received database query code, wherein the query analysis module is further programmed to submit database query code to a database server for execution using the database, and
an inquiry plan module programmed to execute the text generative machine learning model to generate a sequence of two or more queries to implement a received inquiry, wherein the received inquiry includes a set of incident details or a natural-language request.

14. The system of claim 13, wherein the sequence of queries includes a list of natural-language step descriptions corresponding to the queries in the sequence.

15. The system of claim 13, further comprising a data storage medium storing the query history data and analysis history data.

16. The system of claim 13, wherein executing the sequence-to-sequence machine learning model includes using abstract syntax tree (AST) representations of the received database query code to generate the corresponding natural-language step descriptions.

17. The system of claim 13, wherein the query analysis module is further programmed to execute the sequence-to-sequence machine learning model to generate corresponding natural-language step descriptions for submodules of a received query.

18. The method of claim 1, wherein the performance characteristics include an execution time for a previously-executed query of the database.

19. The method of claim 1, wherein the performance characteristics include whether a previous query of the database executed successfully.

20. The method of claim 1, wherein, the performance characteristics include whether a previous inquiry using the database was resolved.

* * * * *